(12) United States Patent
Zambetti et al.

(10) Patent No.: US 8,970,195 B2
(45) Date of Patent: Mar. 3, 2015

(54) METHOD FOR CONTROLLING AN INTERLEAVING MULTIPHASE REGULATOR AND CORRESPONDING SYSTEM

(75) Inventors: Osvaldo Enrico Zambetti, Milan (IT); Alessandro Zafarana, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 941 days.

(21) Appl. No.: 12/813,025

(22) Filed: Jun. 10, 2010

(65) Prior Publication Data

US 2011/0133704 A1    Jun. 9, 2011

(30) Foreign Application Priority Data

Jun. 10, 2009  (IT) .............................. MI2009A1020

(51) Int. Cl.
  G05F 1/00    (2006.01)
  H02M 3/158    (2006.01)
(52) U.S. Cl.
  CPC .................................. H02M 3/1584 (2013.01)
  USPC ....................................................... 323/283
(58) Field of Classification Search
  USPC ......... 323/268–272, 282–285, 234, 237, 265; 363/65
  See application file for complete search history.

(56) References Cited

U.S. PATENT DOCUMENTS

| | | | |
|---|---|---|---|
| 6,515,460 B1 * | 2/2003 | Farrenkopf | 323/272 |
| 6,670,794 B1 * | 12/2003 | Wang et al. | 323/213 |
| 7,414,383 B2 * | 8/2008 | Burton et al. | 323/271 |
| 7,443,150 B2 * | 10/2008 | Schiff | 323/282 |
| 8,305,062 B2 | 11/2012 | Zafarana et al. | |
| 2006/0139016 A1 * | 6/2006 | Schuellein et al. | 323/272 |
| 2007/0001655 A1 * | 1/2007 | Schiff | 323/246 |
| 2007/0290664 A1 * | 12/2007 | Moyer et al. | 323/272 |
| 2008/0197824 A1 * | 8/2008 | Qiu et al. | 323/272 |

(Continued)

FOREIGN PATENT DOCUMENTS

EP    1 826 893 A    8/2007

OTHER PUBLICATIONS

Jovanovic et al., "A Novel Low-Cost Implementation of Democratic Load-Current Sharing of Paralleled Converter Modules", IEEE Transactions on Power Electronics, IEEE Service Center vol. 11, No. 4, Piscataway, New Jersey, Jul. 1, 1996.

(Continued)

*Primary Examiner* — Adolf Berhane
*Assistant Examiner* — Jeffrey Gblende
(74) *Attorney, Agent, or Firm* — Seed IP Law Group PLLC

(57) ABSTRACT

A method is provided for controlling turn-on of phases of a multiphase regulator. According to the method, there are tested the conditions necessary for the turn-on of a phase to be turned-on indicated by a first cell of the phase register, and in response to a positive result a corresponding ramp signal is reset. There is then tested the conditions necessary for the turn-on of a phase successive to the phase to be turned on according to the list of priorities of the phase register, and corresponding ramp signals are reset if there is a positive result. In response to no positive results of testing conditions necessary for the turn-on of all phases successive to the phase to be turned on, there is reset a ramp signal corresponding to a phase successive to a last turned on phase indicated by a last cell of the phase register.

20 Claims, 21 Drawing Sheets

(56) References Cited

U.S. PATENT DOCUMENTS

2008/0231342 A1* 9/2008 Tabaian et al. ............. 327/512
2010/0033151 A1* 2/2010 Wu et al. ................... 323/285

OTHER PUBLICATIONS

International Search Report and Written Opinion for MI20091020, Munich Italy, Jan. 26, 2010.

Hybrid Controller (4+1) for AMD SVID and PVID Processors, L6740L, Jun. 2007, Rev. 0.66, pp. 1-44, STMicroelectronics.
2/3/4 Phase Buck Controller for VR10, VR11 and VR11.1 Processor Applications, L6756D, Aug. 2008, Rev. 0.12, pp. 1-36, STMicroelectronics.
Intersil, Micrprocessor CORE Voltage Regulator Multi-Phase Buck PWM Controller, HIP6301, Data Sheet, Mar. 2000, File No. 4765.1, pp. 1-16.

* cited by examiner

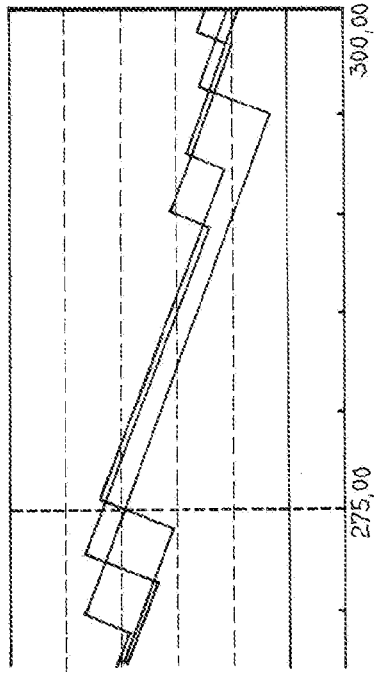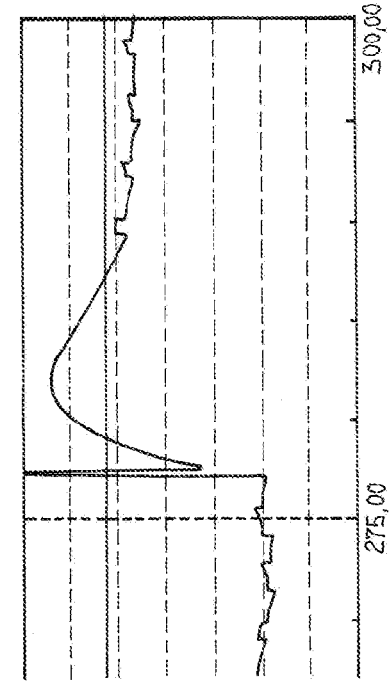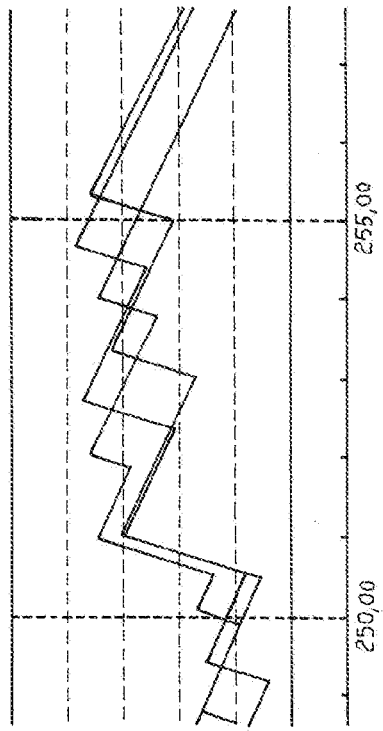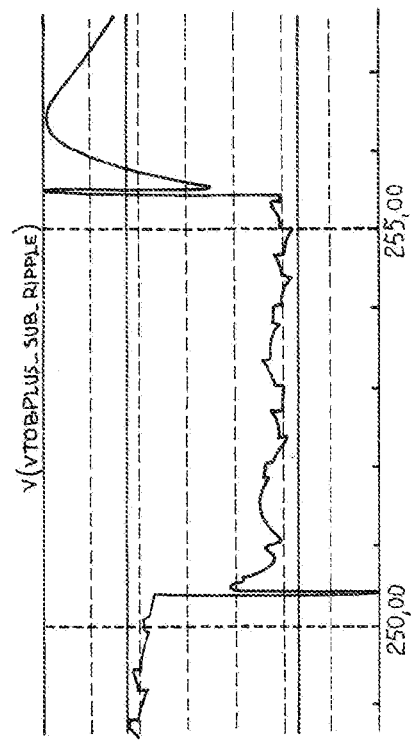
Load applied
FIG. 2A
PRIOR ART
Load realeased
FIG. 2B
PRIOR ART

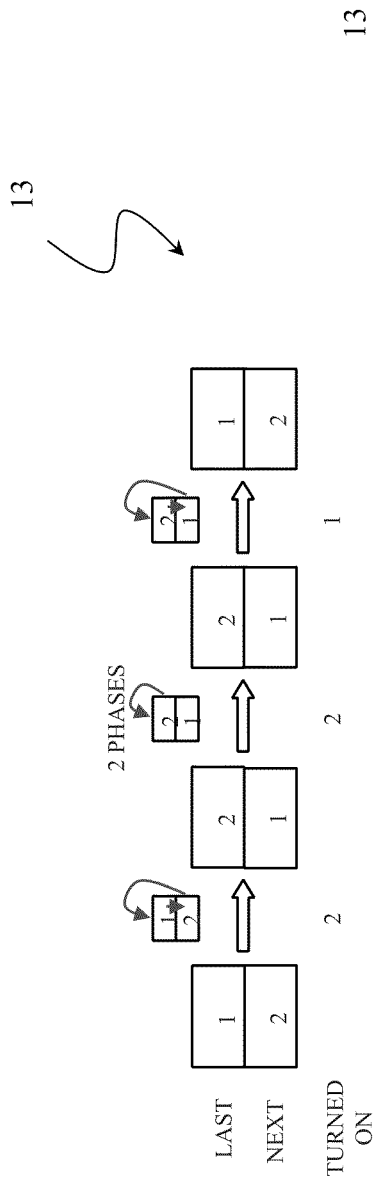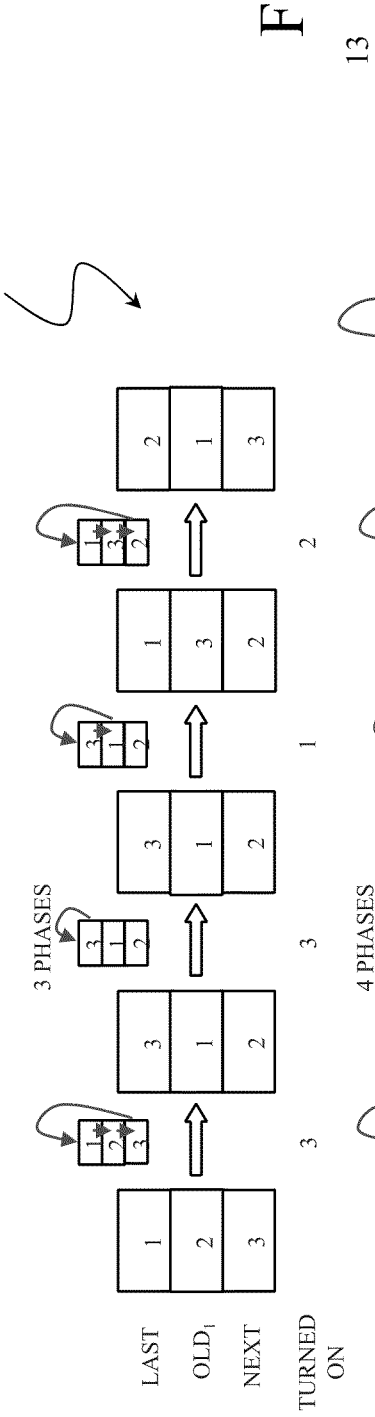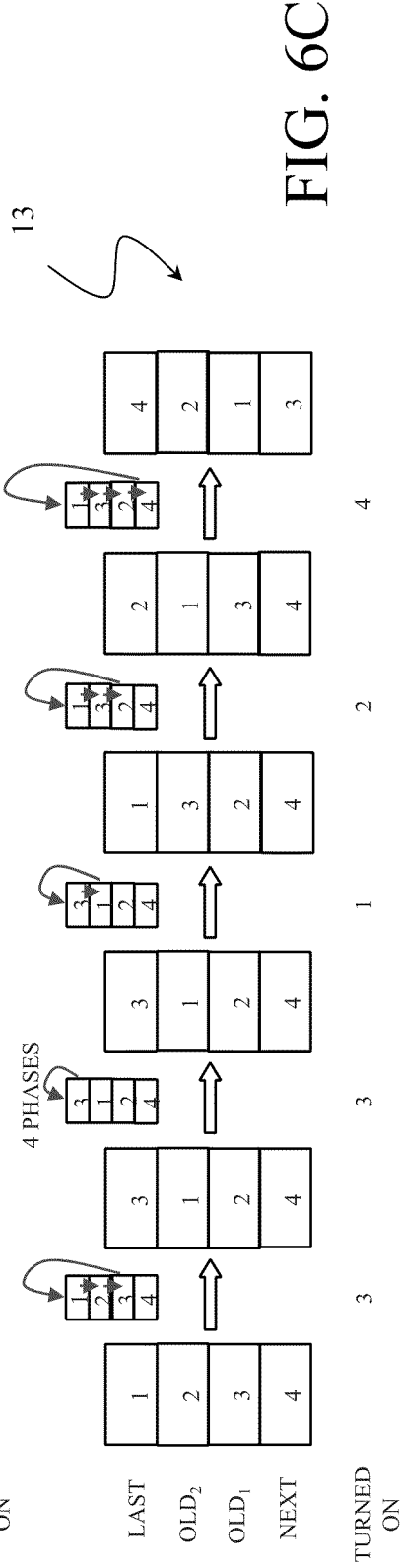

METHOD FOR CONTROLLING AN INTERLEAVING MULTIPHASE REGULATOR AND CORRESPONDING SYSTEM

CROSS-REFERENCE TO RELATED APPLICATIONS

This application is based upon and claims priority from Italian Patent Application No. MI2009A 001020, filed Jun. 10, 2009, the entire disclosure of which is herein incorporated by reference.

FIELD OF THE INVENTION

The present invention relates to electronic circuits, and more particularly to methods for controlling the turn-on of multiple phases of a multiphase regulator of the interleaving type and corresponding modulation systems.

BACKGROUND OF THE INVENTION

As is well known, microprocessors or central processing units ("CPUs") for personal computers, workstations, and servers now require very sophisticated mechanisms for the controlling the supply voltage reference to which they are connected. These references should meet high precision requirements both under rest conditions and under load transient conditions.

Suitable current or voltage controller devices are thus used that are able to supply suitable voltage references. The requirements of this specific field have led to the use of, for these controller devices or "regulators", multiphase buck topologies that are the most suitable for meeting the multiple requirements for these references.

Such a regulator comprises, for example, a converter of the DC-DC interleaving type that is realized by connecting in parallel N DC-DC converters in Buck configuration, also known as step-down configuration (i.e., connecting together their input and output terminals driven in and out of phase, or in an interleaved way).

The converters are interleaved with each other for a value equal to 1/N so as to ensure a low oscillation or ripple of the output voltage value and a low value for the efficient current value or input RMS ("Root-Mean-Square").

A multiphase regulator essentially comprises a controller connected to n buffers or phases (multiphase configuration), which in turn essentially comprise pairs of switches, known as High Side and Low Side, driven by the controller so as to supply the power requested by a CPU that is connected to the output terminal of the multiphase regulator.

To meet very fast and significant load transients (e.g., up to 100 A in 50 ns), the multiphase regulators require non-linear controls that are activated in the presence of load transients and simultaneously turn on all of the available phases for sustaining the value of the voltage on its output terminal.

Moreover, multiphase regulators comprise control mechanisms for avoiding an unbalance of the currents between the phases, so as to ensure the thermal balance and avoid excessive stress on the components of its power stages (and in particular, of the power MOS transistors and the inductors).

The operation of a multiphase regulator is well known. FIG. 1 shows a block diagram of a multiphase regulator of the buck type with N phases.

The multiphase regulator 1 has a controller 6 connected to n buffers or phases Fi, which each include a pair of switches, High Side and Low Side, driven through respective driving circuits Dri by the controller 6, so as to supply a requested power (for example by a CPU) to the output terminal OUT of the multiphase regulator 1.

In more detail, each phase Fi of the multiphase regulator 1 comprises a High Side switch $SW_{HSi}$ connected in series to a Low Side switch $SW_{LSi}$ between first and second voltage references, in particular an input voltage Vin and ground GND.

Each phase Fi also comprises an inductor Li coupled between ground GND and a switch node, or phase node, that is intermediate between the switches $SW_{HSi}$ and $SW_{LSi}$. The multiphase regulator 1 also comprises an output capacitor Cout coupled between the output terminal OUT and ground GND. Across the capacitor Cout there is an output voltage value Vout.

The controller 6 supplies a modulation signal PWMi of the PWM type to the High Side switches $SW_{HSi}$ and Low Side switches $SW_{LSi}$ of the phases Fi, which are sensitive to the level of the signal PWMi. In particular, the High Side switches are on and the Low Side switches are off if PWMi=1, and vice versa the High Side switches are off and the Low Side switches are on if PWMi=0. For this purpose, the controller 6 comprises a PWM signal generator 2 and an oscillator 3 of the interleaving type.

In particular, the oscillator 3 is connected to the generator 2 and supplies it with a ramp signal RAMPi for each phase Fi, and the generator 2 supplies respective modulation signals PWMi to the driving blocks Dri of the phases Fi.

In the exemplary multiphase regulator described in Italian Patent Application No. MI2008A 001066 (which is also assigned to the Assignee of the present invention), the oscillator 3 applies a modulation in frequency and a modulation index to minimize the entity of the harmonic at the switching frequency FSW of the multiphase regulator 1.

The multiphase regulator 1 also comprises a current sharing control circuit 4 that receives the current value $I_{Li}$ of each phase Fi and supplies a balance voltage value $V_{BALANCE\_i}$ for each phase Fi, with such balance voltage $V_{BALANCE\_i}$ being added by an adder node Xi with a signal COMP supplied at the output terminal O of an error amplifier 5 of the multiphase regulator 1.

The current sharing control circuit 4 substantially provides information on the unbalance of the currents in the phases Fi of the multiphase regulator 1. In particular, the current sharing control circuit 4 measures the current flowing in each single inductor Li of the phases Fi and compares this with an average current IAVG. A shift of the current of a phase from this average current thus results in a smaller or greater duty cycle of the balance voltage $V_{BALANCE\_i}$ generated for that phase.

The error amplifier 5 has a first input terminal I1 that receives a reference voltage value REF and a second input terminal I2 connected, through a first impedance ZFB, to the output terminal OUT of the multiphase regulator 1, and also connected, through a second impedance ZF, to its output terminal O, which in turn is connected to the adder nodes Xi.

In the case of a load transient, according to the use of linear or non-linear techniques, the multiphase regulator 1 responds by turning on or not all of the N available phases. A description of these techniques can be found in European Patent Application No. EP 1 826 893 (Aug. 29, 2007), in the name of STMicroelectronics S.r.l.

FIGS. 2A and 2B show the response of a multiphase regulator having three phases in accordance with the principles of this European Patent Application. As shown in FIG. 2A, with a load applied, such a multiphase regulator, during a load transient, simultaneously turns on all of the three available phases.

As seen in the figure, the last phase turned on before the transient with load application is the phase F1, but due to the presence of an interleaving which flows temporally and independently from the load transient, the phase turned on immediately after the transient is again the phase F1 which, at this point, is also the one that carries more current.

Moreover, the loop, that is the current balance circuit 4 (current sharing loop), noting the unbalance of the currents, tries to correct the balance voltages to correct this current unbalance. The balance voltages, in correspondence with the adder nodes, are added to the signal COMP, which represents information on the output voltage, and their sums generate signals which identify respective control voltages which are compared with the corresponding ramp signals RAMPi for generating in turn respective modulation signals PWMi.

The result of this correction is a modulation signal PWM1 that is shorter than its due on the phase F1, and modulation signals PWM2 and PWM3 that are wider on the phases F2 and F3. This behavior generates a perturbation on the main control loop of the output voltage (i.e., the loop comprising the error amplifier 5) causing a lack of the orthogonality (i.e., the independence property) between the two control loops of the multiphase regulator 1, that is the main output voltage loop and the current balance (or current sharing) loop.

For regulating the output voltage $V_{OUT}$, the main voltage loop should impose the duration of the turn-on Ton of the phases F1, F2, and F3 independently from the unbalance of the currents. To do this it is necessary for the bands of the two main voltage and current sharing loops to be very different from each other, in particular to be different by at least one decade.

The requirement of a very low band of the current sharing loop, however, jeopardizes the balance of the currents when the load frequency varies (i.e., when there are beats between the load frequency and the switching frequency of the regulator as a whole). This problem is described in greater detail in Italian Patent Application No. MI2008A 001066 (filed Jun. 13, 2008) in the name of STMicroelectronics S.r.l.

The same mechanism triggers in the case of a load transient under current release (load release), as shown in FIG. 2B. In particular, as shown in this figure, the last phase being turned on before the load release is the phase F3, subsequently the first ramp which is intercepted is not the one relative to the modulation signal of the phase F1, PWM1, (which is, theatrically, the one that should carry less current), but the one of the modulation signal of the phase F2, PWM2.

This behavior in the load release step generates the worst problems in the case of repeated load transients. The multiphase regulator 1 generates a frequency beat on the control voltage of the PWM modulation signals equal to the difference between the frequency of repetition of the load transients FL and the proper switching frequency FSW of the multiphase regulator itself.

In this situation, the current sharing loop cannot ensure the correct current balance due to the strong frequency beats and the low passing band of the same loop.

The result is a strong oscillation of the currents, as shown in FIG. 3A in the case of FSW=300 kHz and FL=305 kHz, which can lead to excessive stresses on the power components or even to a static unbalance of the currents, as shown in FIG. 3B in the case of FSW=300 kHz and FL=300 kHz, with disastrous consequences (for example, from the thermal design viewpoint of the motherboard containing the CPU that is controlled by this type of multiphase regulator).

Some technical solutions are known for overcoming these drawbacks and the problem of the beat of the currents during repeated load transients.

A solution known as Adaptive Firing Order ("AFO") is described in U.S. Patent Application Publication No. 2008/0197824 (Aug. 21, 2008).

In this solution, the turn-on sequence of the phases is determined by a direct comparison of the currents of the phases. Two lists are used: a "standby list" and a "waiting list". The phases in the "standby list" cannot be turned on while the phase which carries less current among those on the "waiting list" is instead turned on. Once turned on, this phase goes into the "standby list" while the phase that, in the "standby list", carries less current is promoted from the "standby list" to the "waiting list", and so on.

Although meeting the aim, this solution is not exempt from drawbacks. For example, the turn-on method used in the AFO solution does not allow the consecutive turn-on of the same phase; to turn it on again, there is at least a one clock cycle wait.

Moreover, the comparison is made directly on the read currents. However, it is well known that, in certain applications, the currents can be very noisy and very close to each other in relation to the switching frequency of the system as a whole and to the type of inductors as used.

The distinction of the current is also affected by a dynamics problem, in particular linked to the fact that, at low load, the current information is very small and thus more likely subject to offset and to switching noise of the multiphase regulator. This dependency on the application makes this method weak since the multiphase regulator could not distinguish at the best the lowest current and erroneously turn on one phase rather than another phase.

Moreover, the decision of the phase turn-on is exclusively made by the control between the currents to determine the lowest current.

SUMMARY OF THE INVENTION

One embodiment of the present invention provides a method for controlling turn-on of phases of a multiphase regulator of the interleaving type, with the phases being turned on by respective modulation signals generated from corresponding ramp signals, and being turned on according to a list of priorities stored by a plurality of cells of a phase register. According to the method, there are tested conditions necessary for the turn-on of a phase to be turned on that is indicated by a first cell of the phase register, and in response to a positive result of this test a corresponding ramp signal is reset. After the resetting of the corresponding ramp signal, there are tested conditions necessary for the turn-on of a phase successive to the phase to be turned on according to the list of priorities of the phase register, and =corresponding ramp signals are reset in response to a positive result of such testing. In response to no positive results of testing conditions necessary for the turn-on of all phases successive to the phase to be turned on, there is a forced reset of a ramp signal corresponding to a phase successive to a last turned on phase that is indicated by a last cell of the phase register, and a return to the testing of the conditions necessary for the turn-on of a phase to be turned on.

Another embodiment of the present invention provides a modulation system that includes a multiphase regulator of the interleaving type having multiple phases, a PWM signal comparator block for the phases, and a modulator supplying ramp signals to the PWM signal comparator block. The modulator comprises control logic for determining a reset sequence of the ramp signals.

BRIEF DESCRIPTION OF THE DRAWINGS

FIGS. 2A and 2B show the patterns of signals of the phases of a conventional multiphase regulator under load application and release conditions;

FIGS. 6A-6C show the operation of control logic of modulation systems according to embodiments of the present invention that have two, three, and four phases;

DETAILED DESCRIPTION

Figure 1:
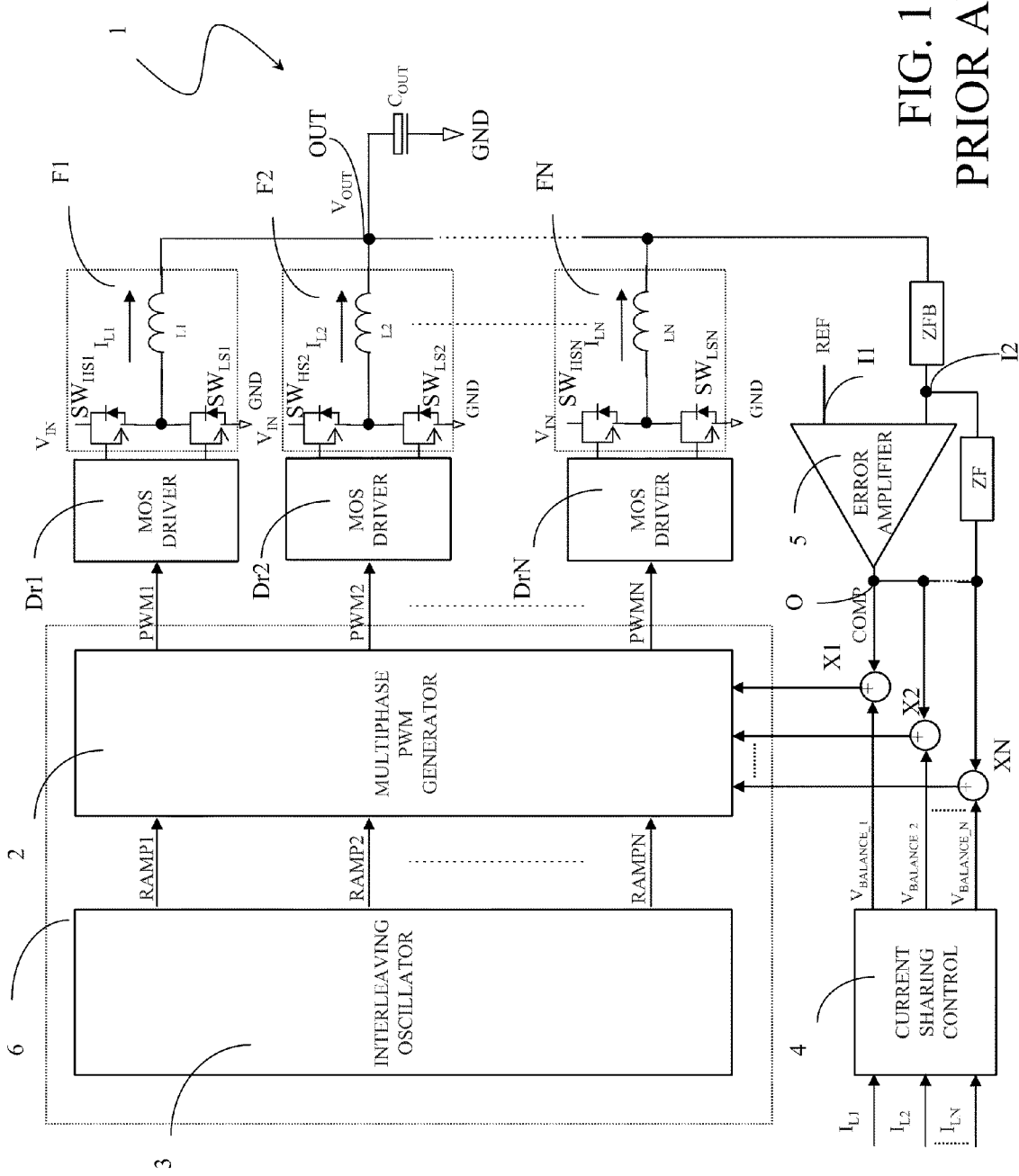
FIG. 1 shows a conventional multiphase regulator of the interleaving type.
Figures 3A, 3B:
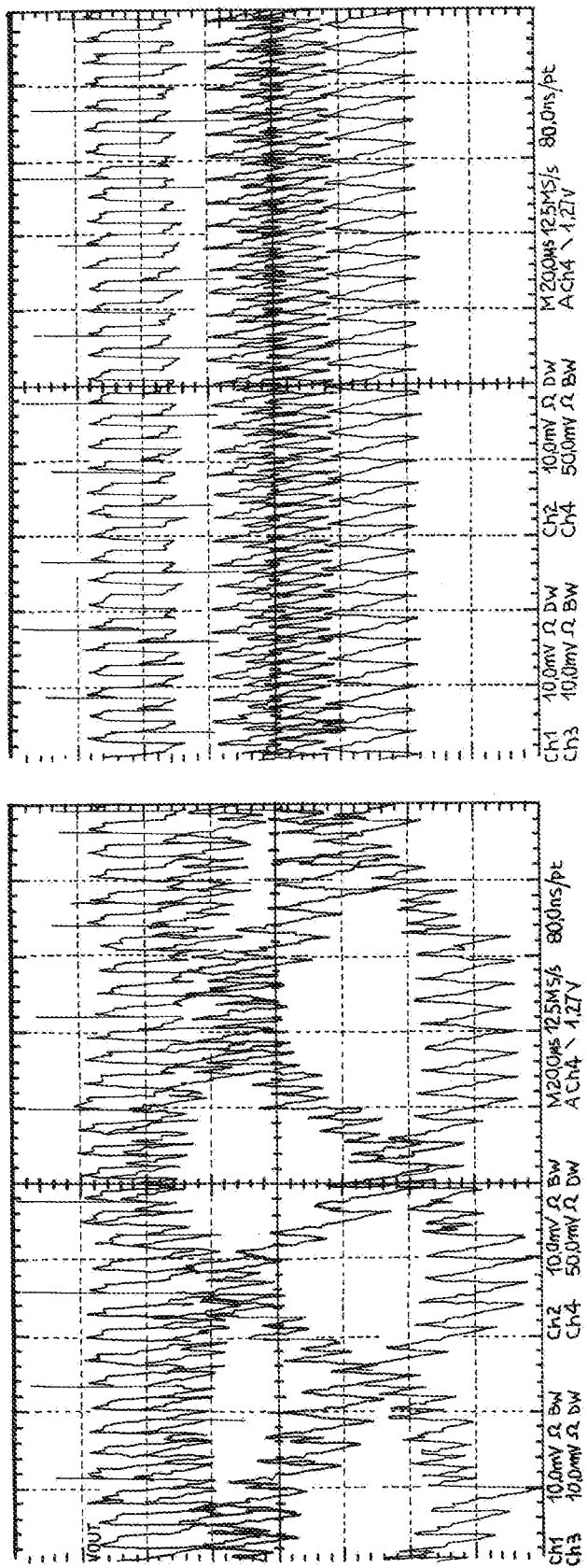
FIGS. 3A and 3B show the oscillations of the currents of the phases of a conventional multiphase regulator.

Embodiments of the present invention provide methods for controlling the turn-on of the phases of a multiphase regulator, and modulators for use in such a multiphase regulator, having such structural and functional characteristics as to overcome the limits and the drawback that affect conventional modulators. The turn-on of the phases of a multiphase regulator is regulated by establishing the reset sequence of the ramp signals being used for the generation of the PWM modulation signals of the phases through a logic that is based on the control voltages of the modulator.

One embodiment of the present invention provides a method for controlling the turn-on of multiple phases of a multiphase regulator of the interleaving type. The phases are driven to be turned on by respective modulation signals generated from corresponding ramp signals and according to a list of priorities contained in cells of a phase register. According to the method, there are tested the conditions necessary for the turn-on of a phase to be turned on indicated by an identifying number contained in a first cell of the phase register, and a corresponding ramp signal is reset in case of a positive result of this testing. There are further tested the conditions necessary for the turn-on of a phase successive to the phase to be turned on according to the list of priorities of the phase register, and further resetting of corresponding ramp signals pending a positive result. There is a final forced reset of a ramp signal corresponding to a phase successive to a last phase turned on being indicated by an identifying number contained in a last cell of the phase register, and a return to the first testing.

In some embodiments of the present invention, the testing of the conditions necessary for the turn-on of a phase comprise testing if a control voltage of the phase is greater than a minimum voltage reference value.

In some embodiments of the present invention, the testing of the conditions necessary for the turn-on of a phase comprise testing if a common control voltage is greater than a minimum voltage reference relative to the phase.

In some embodiments of the present invention, the testing of the conditions necessary for the turn-on of a phase further comprise an update of a further cell indicating the last reset of the phase register by insertion of the identifying number of the turned on phase.

In such embodiments, the control method preferably further comprises, after the updating, a testing of the turn-on of a phase by testing the presence or not of a corresponding modulation signal. Further, the control method preferably further comprises, after the turn-on testing, an update of the phase register in which an identifying number of the phase which has been turned on is inserted in the last cell of the phase register, while the values contained in the other cells shift in consequence, in the case of a positive result of the turn-on. In such an embodiment, the update step is preferably not carried out in the case of the testing of the conditions necessary for the turn-on of a phase giving a positive result on a last turned on phase having an identifying number contained in the last cell of the phase register.

Another embodiment of the present invention provides a modulation system of the type comprising a modulator for supplying a plurality of ramp signals to a PWM signal generator for multiple phases of a multiphase regulator of the interleaving type, with the modulator comprising control logic for determining a reset sequence of the ramp signals.

In some embodiments of the present invention, the modulator further comprises a phase register that includes multiple cells according to a list of priorities, with the cells being suitable for containing identifying numbers of the phases. A first cell contains an identifying number of a phase to be turned on as determined by the control logic and a last cell contains an identifying number of a last turned on phase.

In some embodiments of the present invention, the control logic writes and updates the content of the cells of the phase register, storing an identifying number of a phase which is turned on in the last cell and making the contained values of the other cells shift up to the first cell.

In some embodiments of the present invention, the modulator has multiple control terminals that receive multiple control voltage signals, with the control voltage signals being obtained by a current sharing control circuit according to the currents of the phases, for example as sum of a contribution of a balance loop of the currents and a regulation loop of the output voltage of the multiphase regulator.

In such embodiments of the present invention, the PWM signal generator preferably comprises multiple comparators, one for each of the phases, with each of the comparators having a first input terminal connected to a corresponding control terminal of the modulator and receiving a respective control voltage signal, a second input terminal connected to a corresponding output terminal of the modulator and receiving a ramp signal, and an output terminal that supplies the modulation signals.

In some embodiments of the present invention, the modulator further comprises multiple feedback terminals connected to the output terminals of the PWM signal generator.

In some embodiments of the present invention, the modulator further has at least one supply terminal connected to a minimum voltage reference corresponding to a minimum voltage value of the modulation signals, for example corresponding to a voltage value at which the ramp signals are reset.

In some embodiments of the present invention, the modulator further comprises a ramp signal generator connected to multiple output terminals of the control logic and to the minimum voltage reference and having multiple output terminals on which there are the ramp signals.

In some embodiments of the present invention, the modulator comprises an input comparator block that includes multiple comparators whose number is identical to the phases, with each of the comparators having a first input terminal connected to a respective control terminal that receives a control voltage signal, a second input terminal connected to the minimum voltage reference, and an output terminal connected to corresponding input terminals of the control logic.

In such embodiments of the present invention, the ramp signal generator preferably comprises multiple MOS transistors, one for each of the phases, coupled in series with a corresponding number of current generators between a supply voltage reference and the minimum voltage reference and interconnected in correspondence with the output terminals, as well as multiple capacitors coupled between each of the output terminals and the minimum voltage reference, in parallel to the MOS transistors, with the MOS transistors having respective control terminals connected to the output terminals of the control logic.

In some embodiments of the present invention, the modulator has a control terminal that receives a common control voltage signal and multiple supply terminals connected to multiple minimum voltage references that are obtained by a current sharing control circuit according to the currents of the phases.

In such embodiments of the present invention, the modulator preferably comprises an input comparator block that includes multiple comparators whose number is equal to the phases, with each of the comparators having a first input terminal connected to the control terminal that receives the common control voltage signal, a second input terminal connected to one of the minimum voltage references, and an output terminal connected to corresponding input terminals of the control logic.

In such embodiments of the present invention, the ramp signal generator preferably comprises multiple MOS transistors, one for each of the phases, coupled in series to a corresponding number of current generators between a supply voltage reference and a respective minimum voltage reference and interconnected in correspondence with the output terminals, as well as multiple capacitors coupled between a respective output terminal and a respective minimum voltage reference, in parallel to the MOS transistors, with the MOS transistors having respective control terminals connected to the output terminals of the control logic.

A further embodiment of the present invention provides a multiphase regulator of the type having at least one modulation system of the type described above connected to multiple phases, with each phase including a pair of switches being driven through driving circuits so as to supply a suitable output voltage value to an output terminal of the multiphase regulator. The multiphase regulator includes a PWM signal generator connected to a modulator of the modulation system and suitable for supplying modulation signals to the phases, a current sharing control circuit that receives the currents of the phases, and an error comparator having a first input terminal that receives a reference voltage value and a second input terminal connected, through a first impedance, to the output terminal, and through a second impedance, to an output terminal.

In some embodiments of the present invention, the current sharing control circuit supplies multiple balance voltages that are added in multiple adder nodes to a signal supplied on the output terminal of the error comparator in order to generate multiple control voltages to be supplied to the modulator and the PWM signal generator.

In some embodiments of the present invention, the current sharing control circuit supplies multiple minimum voltage references (connected to multiple supply terminals of the modulator), and the output terminal of the error comparator is connected to a control terminal of the PWM signal generator.

The characteristics and the advantages of control methods and modulation systems according to the present invention will be apparent from the following description of an exemplary embodiment that is given by way of indicative and non-limiting example with reference to the annexed drawings.

Figure 4:
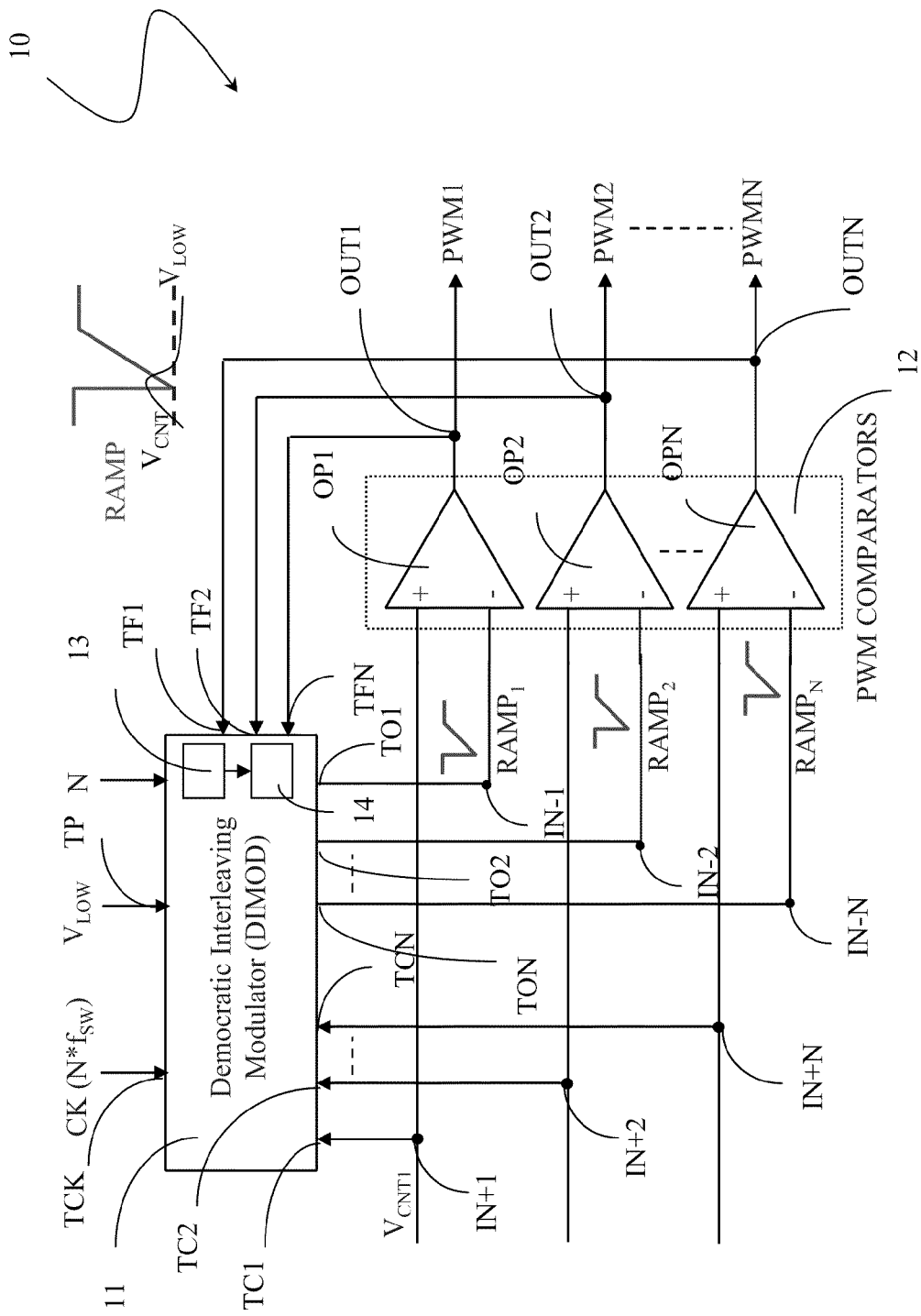
FIG. 4 shows a modulation system for a multiphase regulator according to one embodiment of the present invention.
Figures 5A, 5B, 5C, 5D:
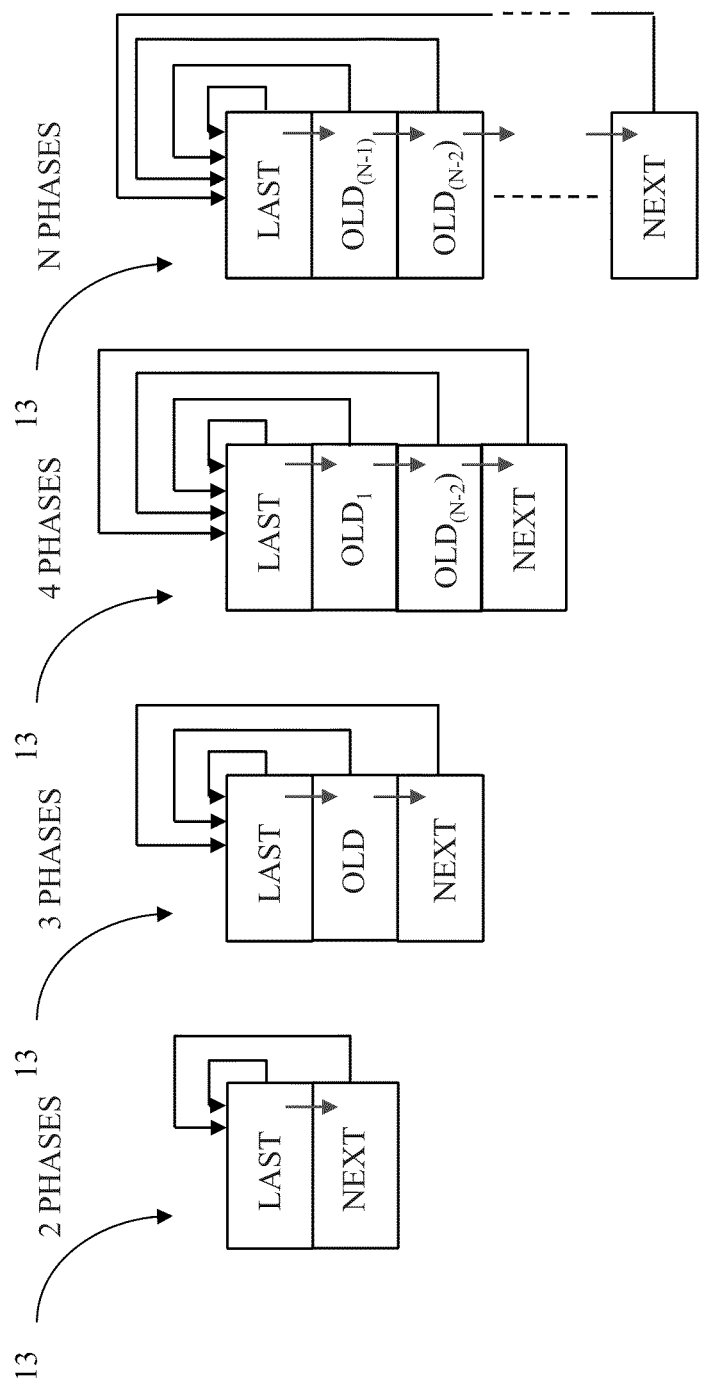
FIGS. 5A-5D show the operation of control logic of the modulation system of FIG. 4.

FIG. 4 shows a modulation system according to one embodiment of the present invention. This modulation system is suitable for use in a multiphase regulator of the interleaving type in buck configuration.

The modulation system 10 comprises a modulator 11 suitable for generating multiple ramp signals RAMPi for a PWM signal comparator block 12.

The modulator 11 is a democratic interleaving modulator ("DIMOD"). This democratic interleaving modulator 11 is particularly suitable for determining the reset sequence of the modulation signals PWMi through logic that directly uses control voltages VCNTi of the multiphase regulator 20 (i.e., signals comprising the information on the unbalance of the currents ILi of the phases Fi and also the information on the voltage regulation) and compares them with ramp signals RAMPi for generating the modulation signals PWMi.

In this way, the sequence of the turn-on of the phases is not determined, as it occurs in conventional systems such as the one described in U.S. Patent Application Publication No. 2008/0197824 as discussed above, by the information of the phase with the lowest current, but is determined by a specific control logic that has, as distinction variables, the control voltages VCNTi of the multiphase regulator 20 to which the modulation system 10 is connected.

Moreover, in accordance with this embodiment of the present invention, the sensitivity to the noise of the currents reading circuits is physically filtered by the currents balance loop.

In particular, the democratic interleaving modulator 11 comprises multiple control terminals TCi that receive corresponding control voltage signals VCNTi, with one for each phase Fi of the multiphase regulator 20 to which the modulation system 10 is connected. (The index i indicates elements relative to the phases, with the value i varying from 1 to N, and N being the overall number of phases.)

The control voltage signals VCNTi are signals that, according to the past turn-on sequence and according to their present status, allow a determination of the successive turn-on sequence.

The democratic interleaving modulator 11 also has multiple output terminals TOi connected to the PWM signal comparator block 12, which has in turn multiple output terminals OUTi on which the modulation signals PWMi are supplied.

In particular, the PWM signal comparator block 12 comprises multiple comparators OPi (one for each phase Fi), which each have a first non-inverting (+) input terminal IN+i connected to a corresponding control terminal TCi of the democratic interleaving modulator 11, a second inverting (−) input terminal IN-i connected to a corresponding output terminal TOi of the democratic interleaving modulator 11 and receiving therefrom a ramp signal RAMPi, and an output terminal OUTi of the modulation system 10 to which the one of the modulation signals PWMi is supplied.

Moreover, in accordance with this embodiment of the present invention, the output terminals OUTi of the modulation system 10 are connected to multiple feedback terminals TFi of the democratic interleaving modulator 11.

Furthermore, the democratic interleaving modulator 11 comprises a clock terminal TCK that receives a signal CK (N*fSW), and a supply terminal TP connected to a minimum voltage reference $V_{LOW}$. In particular, N is the number of phases; the signal CK (N*FSW) indicates multiple interleaved clock signals of the phases that are generated starting from a system clock signal CK and whose frequency is equal to N*fSW; $V_{LOW}$ is a minimum voltage value of the ramp signals RAMPi of the trailing-edge type and corresponds to the voltage value at which the ramp signal RAMPi at the input of the comparators OPi of the PWM signal comparator block 12 is reset; VCNTi are the control voltages of the multiphase regulator 20 that are obtained from the sum of the contribution of the currents balance loop (current sharing control) and that of the output voltage regulation represented by the output of the error amplifier of the multiphase regulator itself, as described in relation to the conventional device of FIG. 1; and PWMi are the PWM modulation signals necessary to regulate the output of the multiphase regulator 20 and are the result of the comparison between a respective ramp signal RAMPi and a control voltage VCNTi of the phase Fi being considered.

According to this embodiment of the present invention, the democratic interleaving modulation system 10 then receives the control voltages VCNTi and the relative modulation signals PWMi, in addition to the minimum voltage reference $V_{LOW}$ and the system clock signal CK.

Further, the democratic interleaving modulator 11 comprises a phase register 13, which comprises N cells containing the information relative to the turn-on sequence of the phases of the last N cycles. The phase register 13 is connected to control logic 14.

Each time that a phase Fi is turned on, its value (in particular the index i that identifies it) is stored in a cell of the phase register 13 called LAST that represents the last turned on phase, while the values contained in the other cells of the phase register 13 (OLD) go to a final position, in particular a cell of the phase register 13 called NEXT that previously occupied the phase Fi that has been turned on, as shown for example in FIGS. 5A-5D for the cases of two, three, four, and N phases, respectively.

In more detail, FIGS. 6A-6C show illustrative examples of the values contained in the phase register 13 according to the turn-on sequence of the phases (TURNED ON) for the cases of two, three, and four phases, respectively.

Considering for instance the case of a system having three phases, as shown in FIG. 6B, when LAST=1, OLD=2, and NEXT=3, the phase which is turned on is F3 and the updating of the phase register 13 will be LAST=3, OLD=1, and NEXT=2.

If in the following cycle, when LAST=3, OLD=1, and NEXT=2, the phase F3 is again turned on, the phase register 13 will be the same. In the following cycle, when the phase F1 is turned on, the register 13 will comprise the values: LAST=1, OLD=3, and NEXT=2. If afterwards the phase F2 is turned on, the register 13 will comprise the values: LAST=2, OLD=1, NEXT=3, and so on.

FIGS. 6A-6C show examples of the shifts of the values contained in the cells of the phase register 13, with such shifts being a function of the phase which is turned on, for systems having two, three, and four phases, respectively.

In its most general form, in accordance with this embodiment of the present invention, at each turn-on cycle, the control logic 14 of the democratic interleaving modulator 11 follows a turn-on priority for the phases represented by the order established by the phase register 13, and in particular: NEXT, OLD1, ... OLDN-2, and finally LAST, which defines in substance a list of priorities.

It is very important that at each cycle any phase can be potentially on. In accordance with the present invention, to understand if a phase Fk can or cannot be turned on, the democratic interleaving modulator 11 verifies that the control voltage VCNTk relative to the phase Fk in question is available and thus able to generate a correct modulation signal PWMk. This condition occurs, in particular, if the control voltage VCNTk is greater than a minimum voltage value for the ramp signals, which is equal to the minimum voltage reference $V_{LOW}$.

Figure 7:
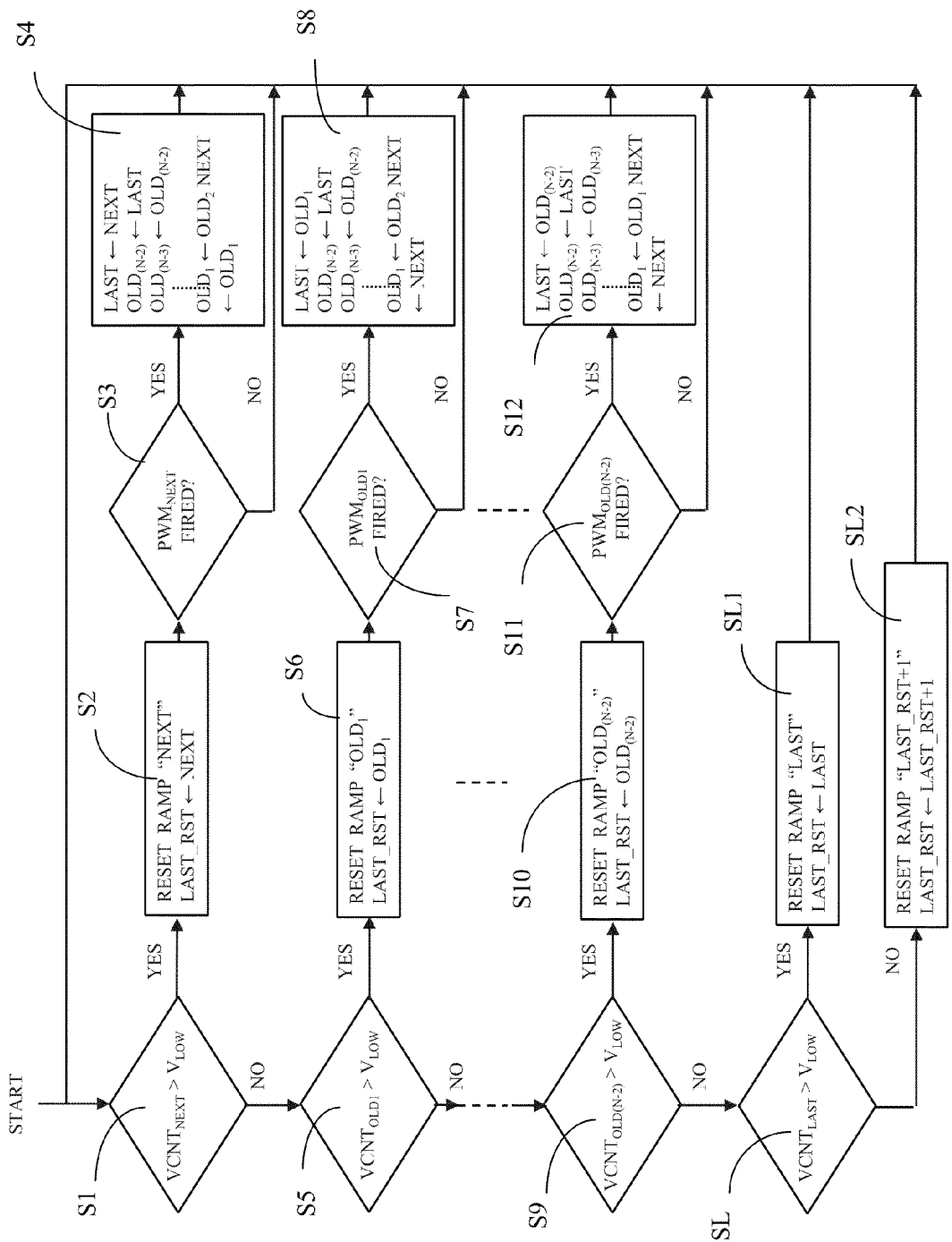
FIG. 7 shows the testing procedure executed by the control logic of the modulation system in accordance with one embodiment of the present invention.

FIG. 7 is a flow chart showing the operation of the control logic of the democratic interleaving modulator for a generic modulation system with N phases in accordance with one embodiment of the present invention.

This control logic 14 implements a testing procedure of the conditions of the phases Fi to be driven to be turned on by respective modulation signals PWMi generated starting from corresponding ramp signals RAMPi.

At the start (START), there is a first testing step S1 that tests if the control voltage $VCNT_{NEXT}$ relative to the phase $F_{NEXT}$ to be turned on (indicated by the identifying number contained in the cell NEXT) is greater than the value of the minimum voltage reference $V_{LOW}$. In the case of a positive outcome (YES), there is performed a second reset step S2 of resetting the ramp signal $RAMP_{NEXT}$ corresponding to the phase $F_{NEXT}$ to be turned on and updating the phase register 13 by inserting the identifying number of the turned-on phase NEXT in a further cell of the phase register 13, in particular a cell LAST_RST indicating the last reset. The procedure then goes on with a third testing step S3 testing if the phase to be turned on $F_{NEXT}$ has been effectively turned on ($PWM_{NEXT}$ FIRED?) through testing of the presence or not of the relative modulation signal $PWM_{NEXT}$. In the case of a positive result (YES) of this third step S3, the procedure comprises a fourth updating phase S4 of updating the phase register 13 in which the value NEXT of the phase which has been turned on $F_{NEXT}$ is inserted in the cell LAST of the phase register 13, while the values contained in the other cells OLDi shift in consequence and the procedure restarts from the beginning. Also in the case in which the third phase S3 has a negative result (NO), the procedure restarts from the beginning (START).

If the first testing step S1 gives a negative result (NO), the procedure goes on with a further testing step S5 testing if the control voltage $VCNT_{OLD1}$ relative to the successive phase $F_{OLD1}$ of the phase register 13 is greater than the minimum voltage reference value $V_{LOW}$. In a similar way as the phase $F_{NEXT}$, also for the successive phase $F_{OLD1}$, the procedure comprises a reset step S6 of resetting the ramp signal $RAMP_{OLD1}$ and updating the phase register 13 by inserting the value OLD1 in the cell LAST_RST; a testing step S7 testing if the phase to be turned on $F_{OLD1}$ has been effectively turned on and an update step S8 updating the phase register 13.

In an equivalent way, the procedure goes on, in the case of negative result of the previous turn-on testing steps, with the successive phases $OLD_{(N-2)}$, up to the last phase $F_{LAST}$, whose value is contained in the cell LAST.

In this case, the procedure comprises, in the case of a positive result (YES) of the testing step SL testing if the control voltage $VCNT_{LAST}$ relative to the last phase $F_{LAST}$ is greater than the value of the minimum voltage reference $V_{LOW}$, a first final reset step SL1 resetting the ramp signal $RAMP_{LAST}$, with a return to the beginning of the procedure, with no update of the phase register 13 being necessary, while, in the case of a negative result (NO) of this testing step, a second final reset step SL1 resetting the ramp signal $RAMP_{LAST\_RST+1}$ of a phase successive to the last turned on phase $F_{LAST}$ and an update step updating the phase register 13 by inserting the value LAST_RST+1 in the cell LAST_RST and with a return to the beginning of the procedure, with no shift of cells of the phase register 13 being necessary.

In substance, at each cycle, according to the list of priorities as defined by the phase register 13, if the control voltage $VCNT_{NEXT}$ relative to the phase to be turned on $F_{NEXT}$ (indicated by the identifying number contained in the cell NEXT) is greater than the minimum voltage reference value $V_{LOW}$, then the democratic interleaving modulator 11 resets the ramp signal $RAMP_{NEXT}$ relative to that phase $F_{NEXT}$ and in consequence updates the content of the cell LAST_RST of the phase register 13 which represents the last ramp signal having been reset. In the contrary case, the democratic interleaving modulator 11 goes on with the control of the phase contained in the successive cell of the phase register 13 (i.e., the cell OLD1), and so on up to the last cell LAST.

Once a ramp signal RAMPi has been reset, the democratic interleaving modulator 11 also tests that the relative phase Fi has been effectively turned on, by testing the presence or not of the corresponding modulation signal PWMi.

If this test gives a positive result, then the phase register 13 is updated, as previously described, while in the contrary case there is no update of the phase register 13 but a return to the start of the procedure.

In accordance with this embodiment of the present invention, in the case in which no control voltage is available, no modulation signal is in turn available. In this case, the ramp signal $RAMP_{LAST\_RST+1}$ successive to the ramp signal ($RAMP_{LAST}$) having been reset in the previous cycle is forced to reset, for facing a possible sudden load transient.

Figure 8:
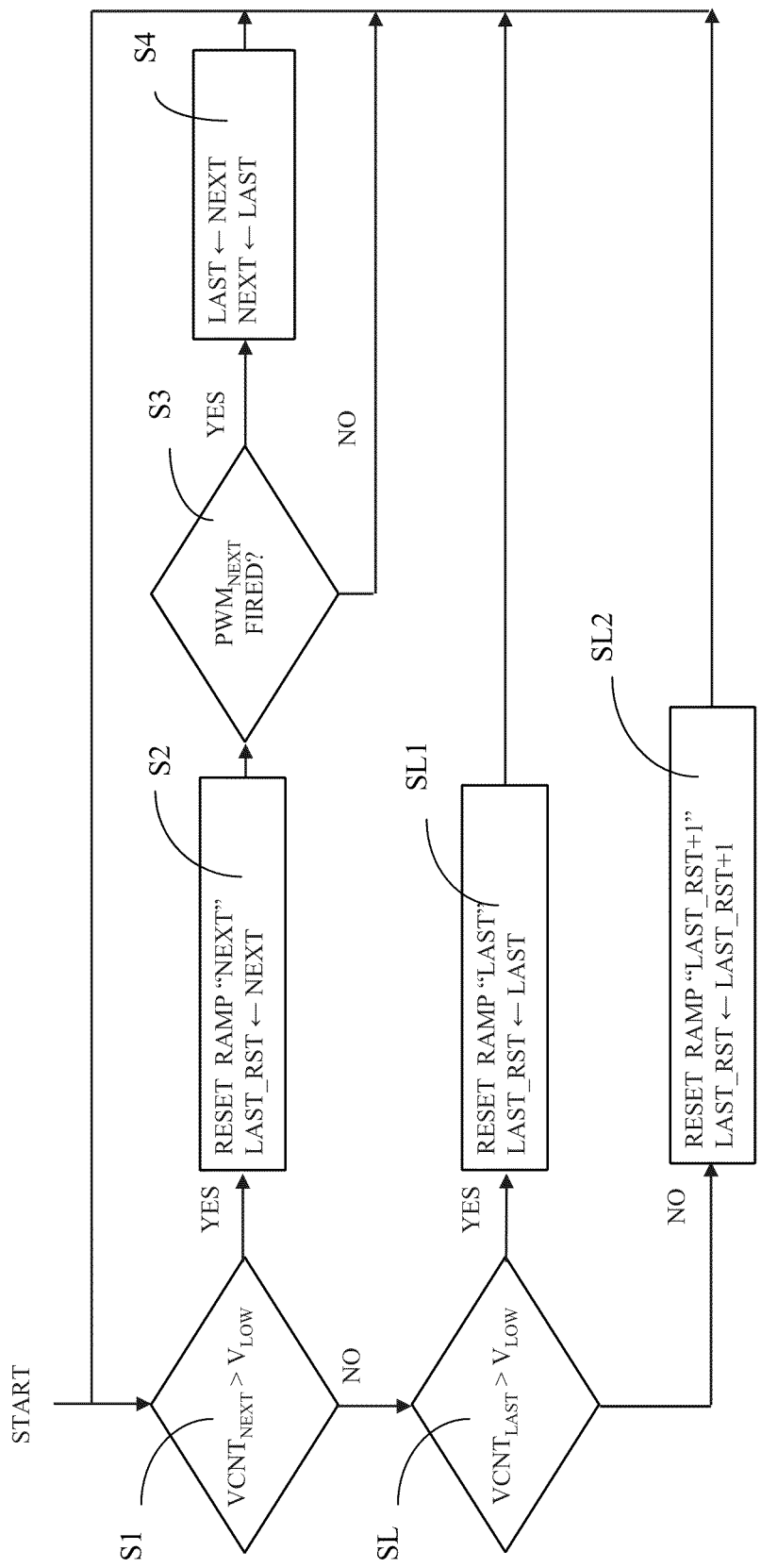
FIGS. 8, 9, and 10 show the testing procedure of FIG. 7 for modulation systems having two, three, and four phases.
Figure 9:
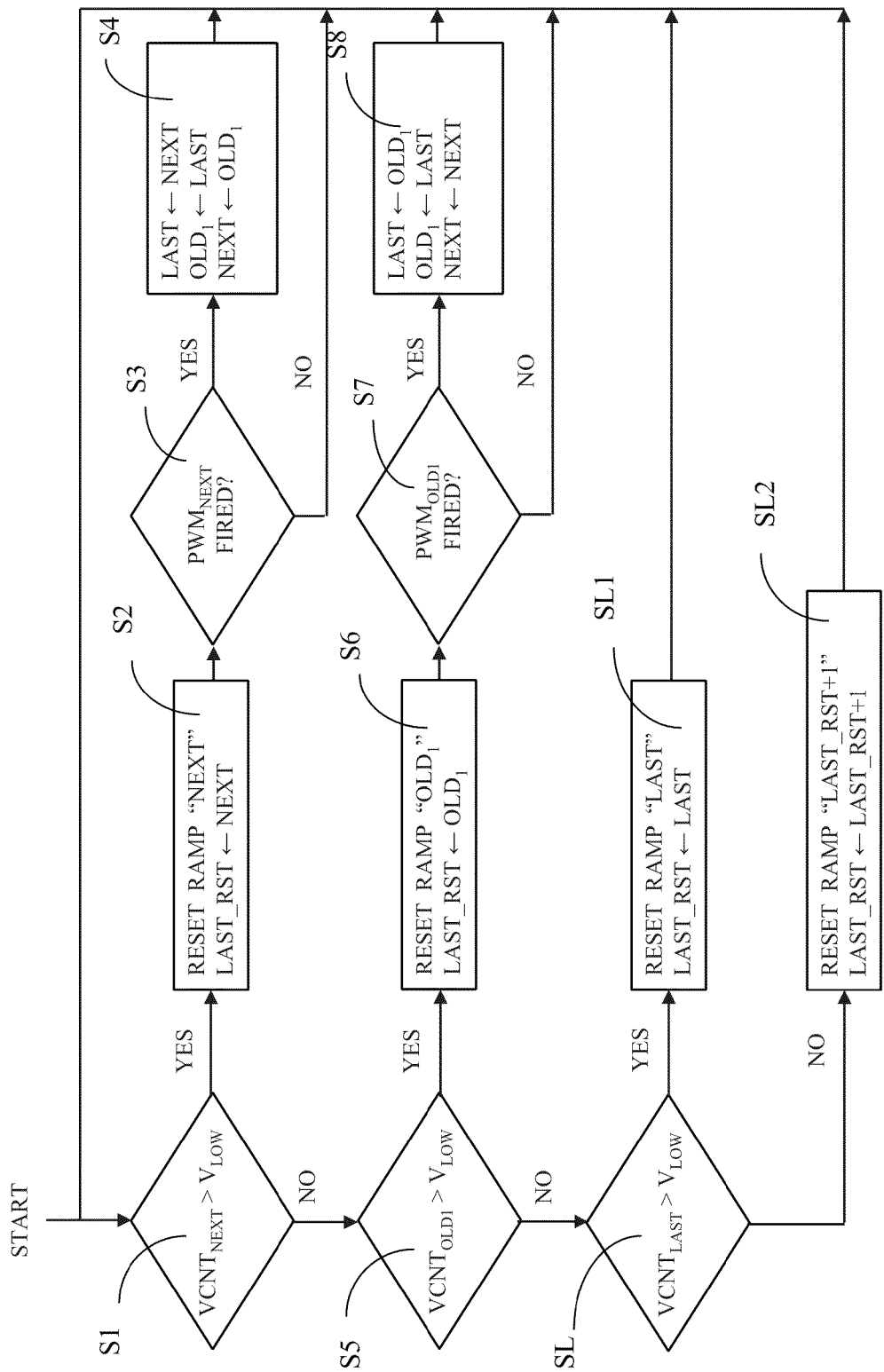
Figure 10:
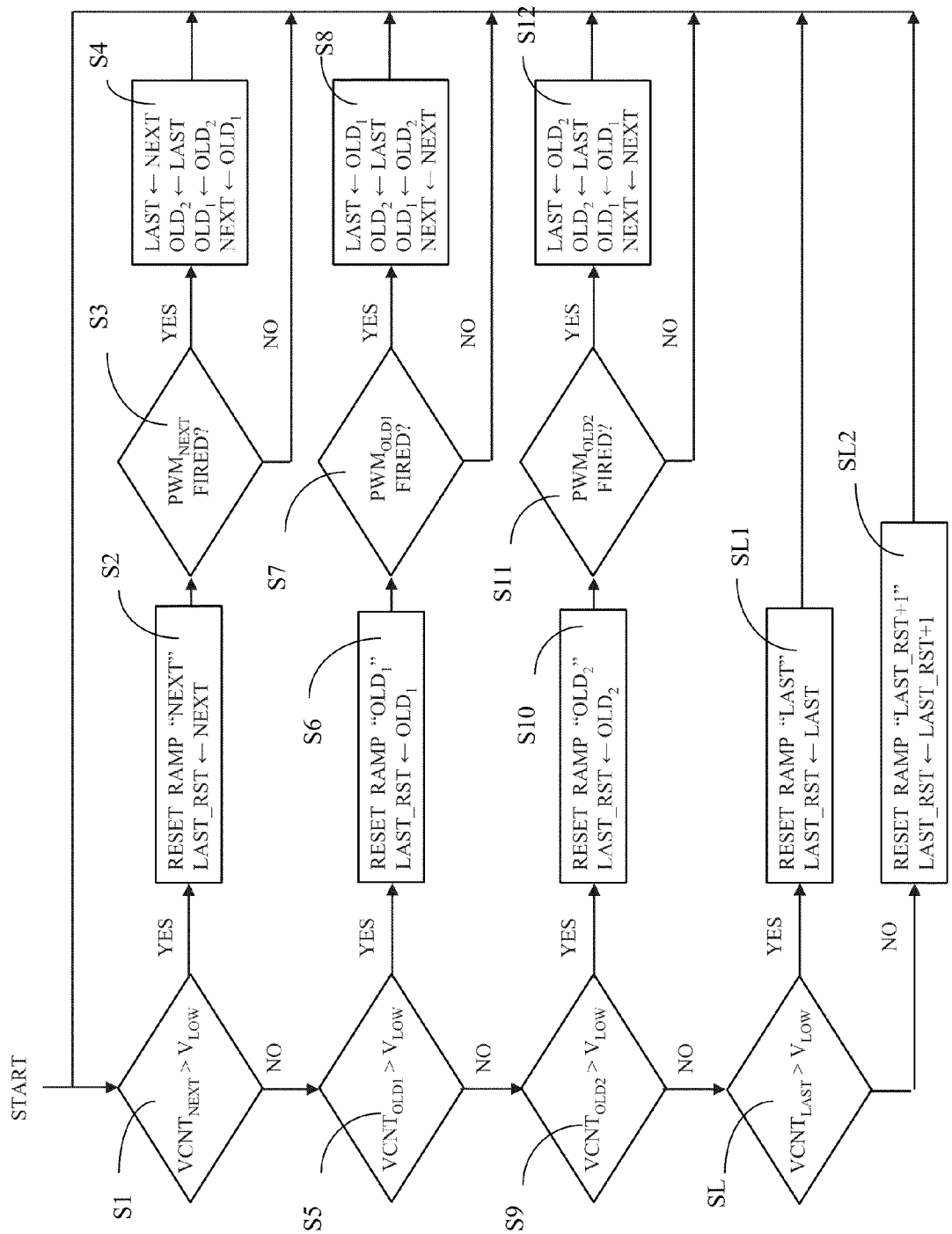

FIGS. 8, 9, and 10 show, by way of example, flow charts relative to modulation systems with two, three, and four phases, respectively, which use the phase registers shown in FIGS. 6A-6C, respectively.

Figure 11:
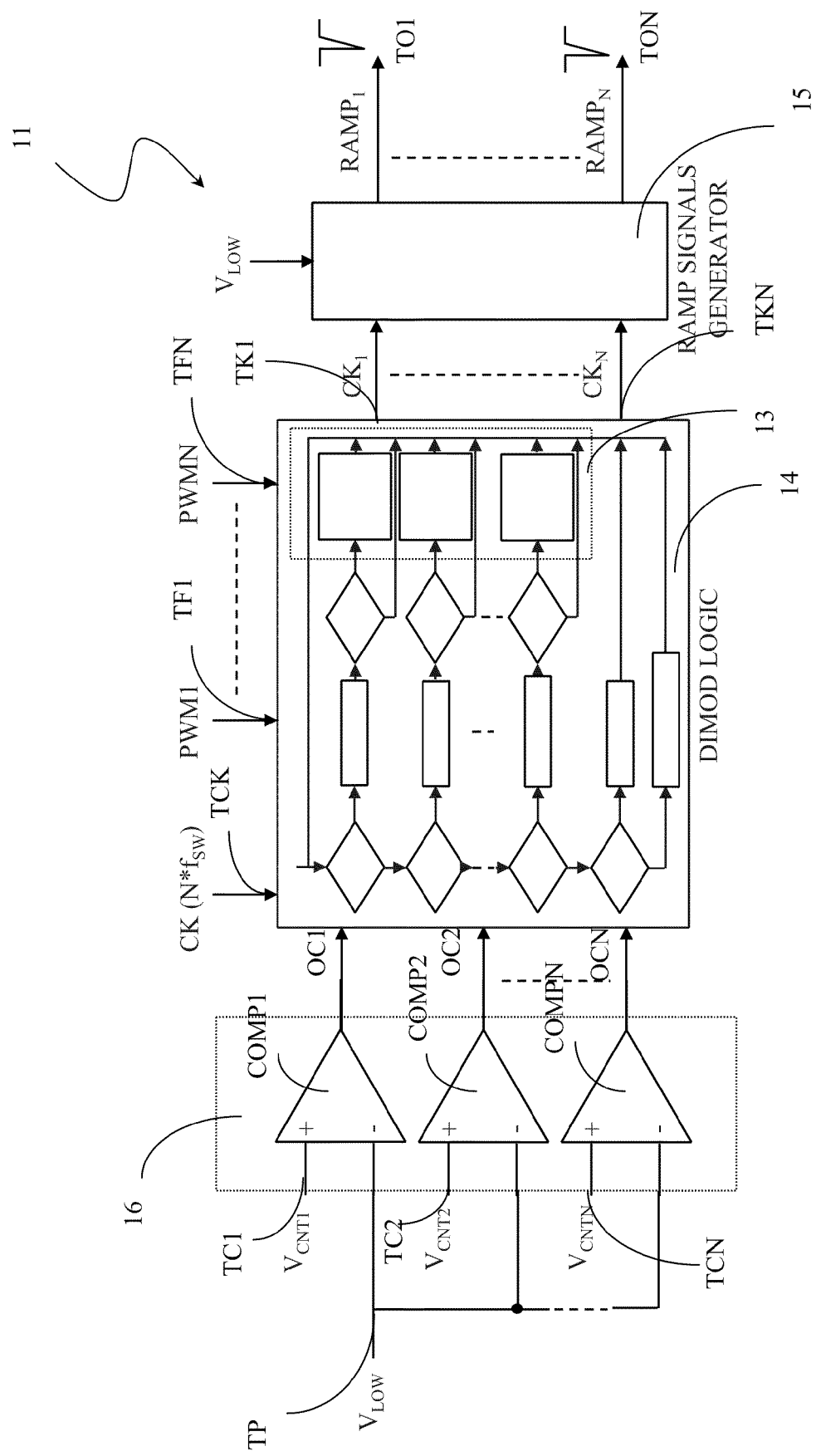
FIG. 11 shows in greater detail a modulator with democratic interleaving of the modulation system in accordance with one embodiment of the present invention.

The democratic interleaving modulator 11 according to one embodiment of the present invention is shown in greater detail in FIG. 11. As shown, the democratic interleaving modulator 11 comprises control logic 14 which operates according to the principles of the procedure described in relation to the flow chart of FIG. 7, acting de facto on the phase register 13, as indicated with a dotted line in the figure.

The democratic interleaving modulator 11 also comprises a ramp signal generator 15 that is connected to multiple output terminals TKi of the control logic 14 on which there are suitable reset signals CKi of the ramp signals RAMPi. This ramp signal generator 15 is connected to the minimum voltage reference $V_{LOW}$.

The ramp signal generator 15 also has multiple output terminals, corresponding to the output terminals TOi of the democratic interleaving modulator 11, on which there are the ramp signals RAMPi.

Furthermore, the democratic interleaving modulator 11 comprises an input comparator block 16 comprising multiple comparators COMPi, whose number is identical to the phases Fi. In particular, each comparator COMPi has a first non-inverting (+) input terminal connected to a respective control terminal TCi receiving a control voltage signal VCNTi, a second inverting (−) input terminal connected to the supply terminal TP and thus to the minimum voltage reference $V_{LOW}$, and an output terminal OCi connected to corresponding input terminals (for convenience always indicated with OCi) of the control logic 14.

Figure 12:
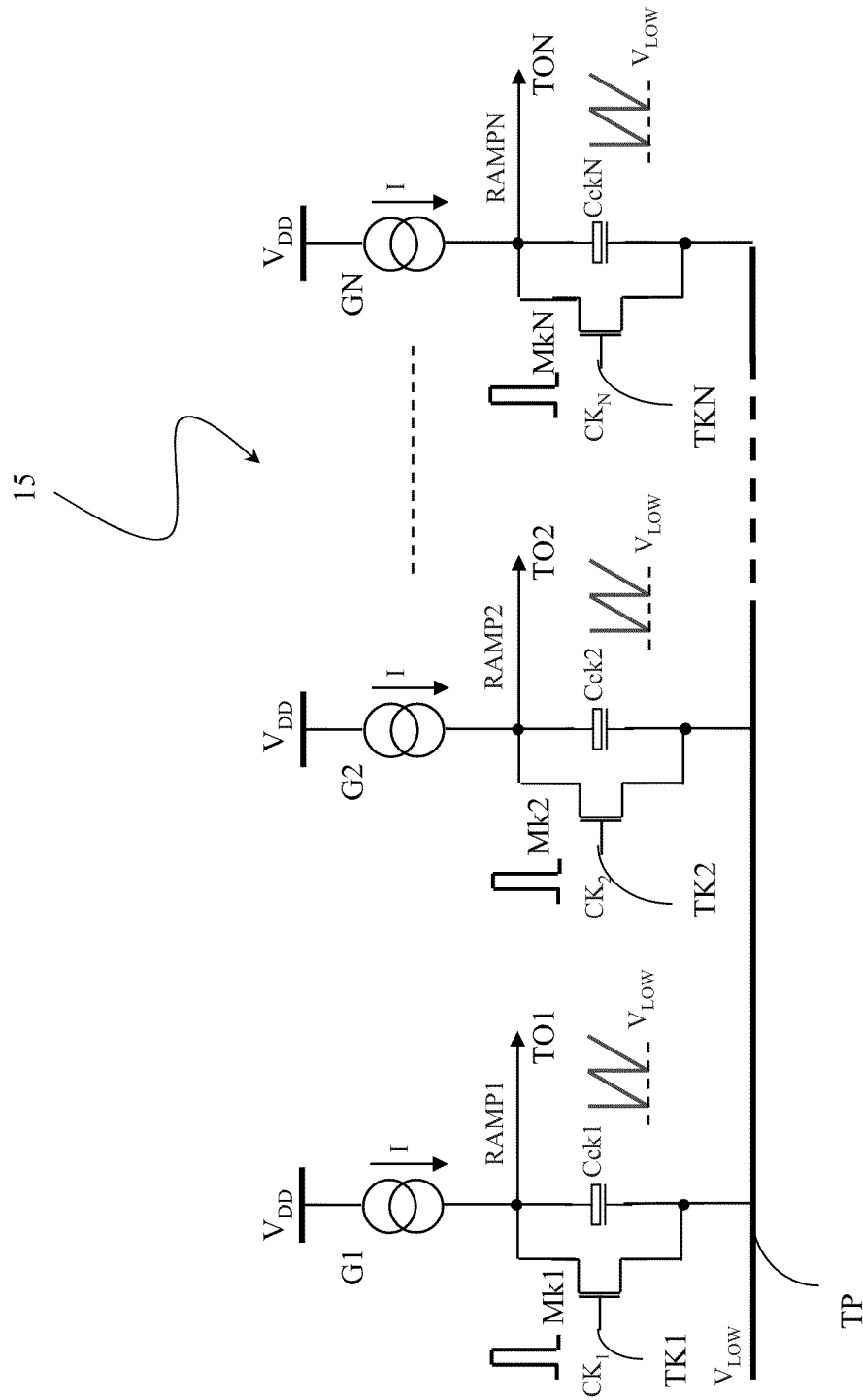
FIG. 12 shows in greater detail a ramp signal generator of the modulator of FIG. 11.

An implementation of the ramp signal generator according to one embodiment of the present invention is shown in FIG. 12.

The ramp signal generator 15 comprises multiple MOS transistors Mki, one for each phase Fi coupled in series with a corresponding current generator Gi between a supply voltage reference $V_{DD}$ and the supply terminal TP of the minimum voltage reference $V_{LOW}$ and interconnected in correspondence with the output terminals TOi for supplying respective ramp signals RAMPi.

Furthermore, the ramp signal generator 15 comprises multiple capacitors Ccki that are each coupled between one output terminal TOi and the supply terminal TP, in parallel with the corresponding MOS transistor Mki.

Moreover, the MOS transistors Mki have respective control (or gate) terminals connected to terminals TKi corresponding to the output terminals of the control logic 14, on which there are the reset signals CKi of the ramp signals RAMPi.

Figure 13:
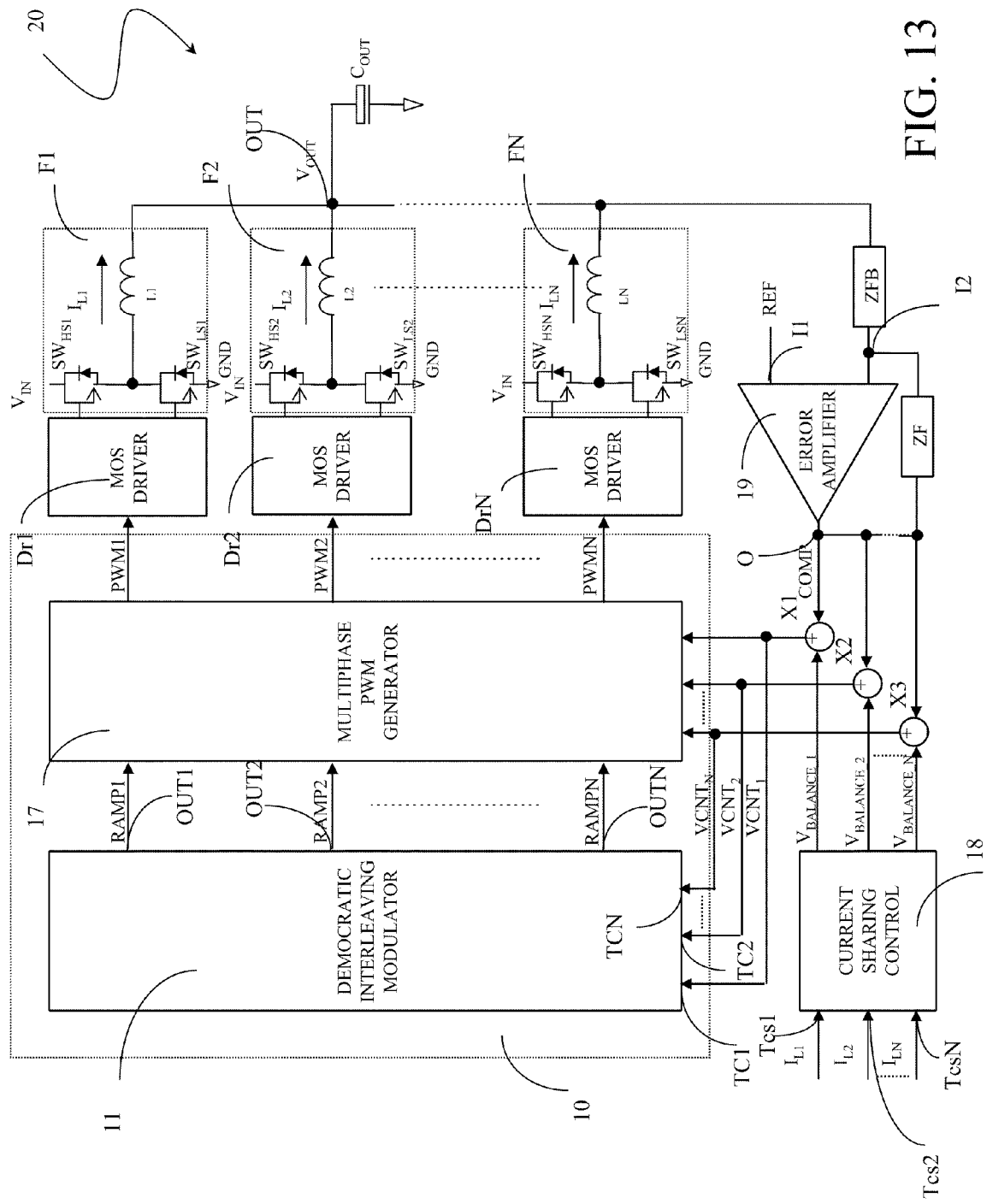
FIG. 13 shows a multiphase regulator comprising the modulation system according to one embodiment of the present invention.

A multiphase regulator according to one embodiment of the present invention is shown in FIG. 13.

As shown, the multiphase regulator 20 comprises the modulation system 10 connected to n buffers (or phases) Fi that each include a pair of switches, High Side and Low Side, driven through respective driving circuits Dri by the modulation system 10 itself so as to supply a suitable output voltage value $V_{OUT}$ to the output terminal OUT.

As explained above, each phase Fi comprises a High Side switch SWHSi connected in series with a Low Side switch SLWSi between a first input voltage reference Vin and ground GND, as well as an inductor Li coupled between a switch node, or phase node, intermediate between the SWHSi and SWLSi switches and ground GND.

The multiphase regulator 20 also comprises an output capacitor $C_{OUT}$ coupled between the output terminal OUT and ground GND. Across the capacitor $C_{OUT}$ there is thus the output voltage value $V_{OUT}$.

As described above, the modulation system 10 comprises the democratic interleaving modulator 11 connected to a PWM signal generator 17 that is suitable for supplying the modulation signals PWMi to the driving circuits Dri and thus to the phases Fi.

In particular, the democratic interleaving modulator 11 has its own output terminals OUTi connected to the ramp PWM signal generator 17 and supplies it with respective ramp signals RAMPi for each phase Fi.

The multiphase regulator 1 also comprises a current sharing balance circuit 18 that receives the current value ILi of each phase Fi and supplies a balance voltage value VBALANCE_i for each phase Fi. This balance voltage VBALAN- CE_i is added in an adder node Xi to a signal COMP supplied on an output terminal O of an error comparator 19 of the multiphase regulator 20.

The error comparator 19 has a first input terminal 11 that receives a reference voltage value REF and a second input terminal 12 connected, through a first impedance ZFB, to the output terminal OUT of the multiphase regulator 20, as well as, through a second impedance ZF, to its output terminal O, in turn connected to the adder nodes Xi.

According to this embodiment of the present invention, the democratic interleaving modulator 11 has multiple control terminals TCi connected to the adder nodes Xi and receiving therefrom the multiple control voltages VCNTi, which are also sent to the PWM signal generator 17.

The operation of the multiphase regulator comprising the democratic interleaving modulator in accordance with one embodiment of the present invention is shown in FIGS. 14, 15A, 15B, and 16, which represent the results of simulations carried out on a three-phase regulator.

Figure 14:
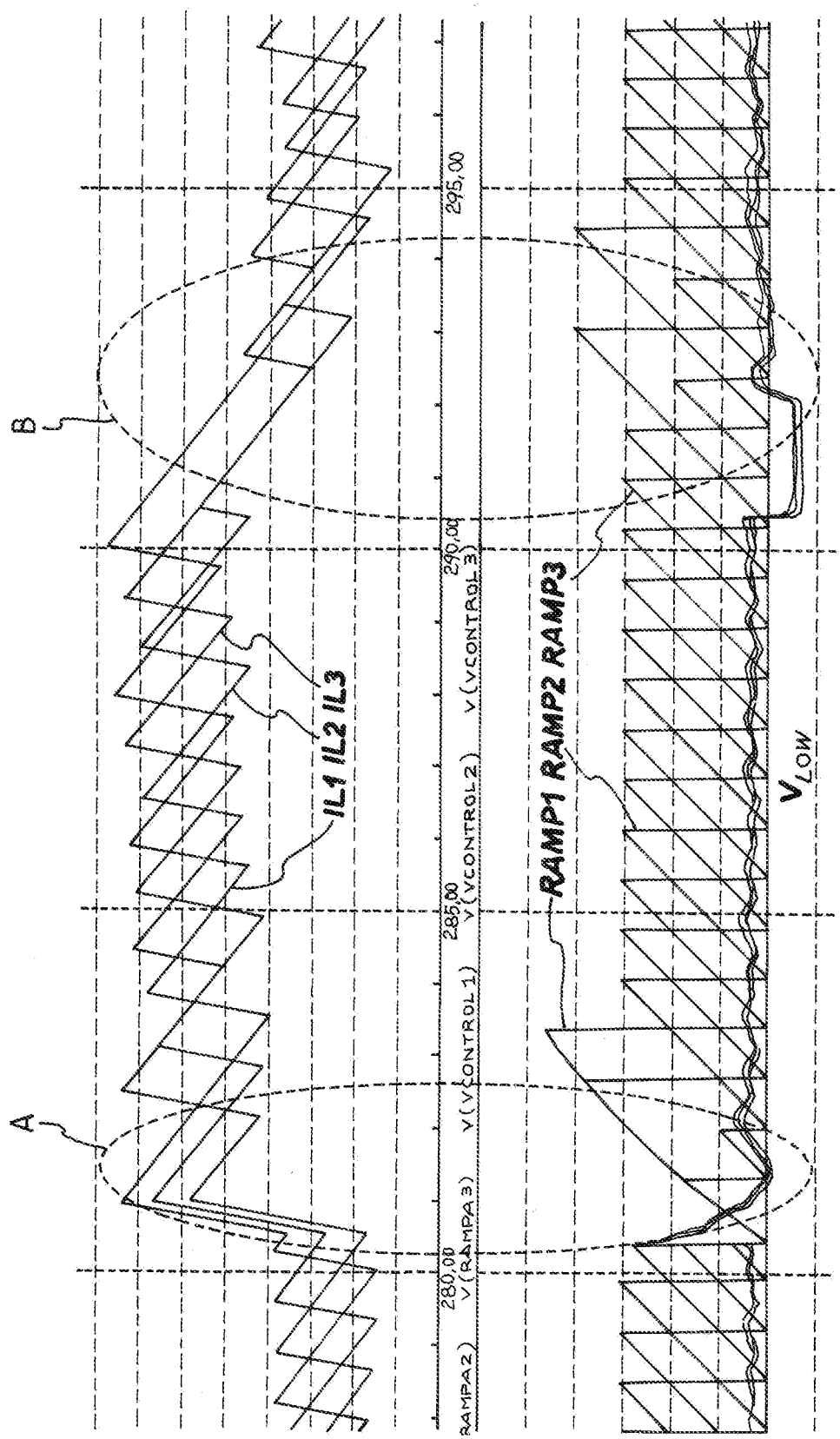
FIGS. 14, 15A, 15B, and 16 show the patterns of signals of the multiphase regulator of FIG. 13.

In particular, FIG. 14 shows the results in the case of application (A) and release (B) of a load, as per the waveforms of the currents IL1, IL2, and IL3 of the inductors.

As shown, the last PWM modulation signal and the last reset of the ramp signal before the load application (A) are those relative to the phase F1. Immediately after the load transient, where the system responds with all the phases, thanks for example to a non-linear control, due to the strong response to the transient all of the control voltages have a lower voltage value than the minimum voltage reference $V_{LOW}$. Advantageously according to this embodiment of the present invention, the ramp signal RAMP2 of the phase F2 is however reset.

At the successive cycle, according to the procedure applied by the democratic interleaving modulator 11, there results LAST=1, OLD=3, NEXT=2, and LAST_RST=2.

At this point the system, according to the list of priorities (that in the case of a three-phase system is NEXT, OLD, LAST) sees that the control voltage of the ramp signal RAMP2 of the phase F2 is greater than the voltage minimum reference $V_{LOW}$ and thus resets it and, since there is also the relative modulation signal PWM2, that is the phase F2 has been correctly turned on, it updates the cells of the phase register 13 putting LAST=2, OLD=1, NEXT=3, and LAST_RST=2.

Subsequently, the non-perturbed multiphase regulator 20 will continue to maintain a nominal interleaving operation condition.

When the load release (B) occurs, the last turned on phase is the phase F2, then there results LAST=2, OLD=1, and NEXT=3. Due to the load release, the control voltages VCNTi saturate however under the minimum voltage reference value $V_{LOW}$ of the ramp signals RAMPi for the modulation signal PWMi.

As long as these control voltages VCNTi remain below the minimum voltage reference value $V_{LOW}$, the multiphase regulator 20 continues to reset the ramp signals RAMPi in a sequential way updating only the cell LAST_RST and leaving the values of the other cells (NEXT, OLDi, and LAST) unvaried.

When the multiphase regulator 20 is activated, since the output voltage $V_{OUT}$ is reaching the desired regulation value, the control voltages VCNTi raise in turn, until they become greater than the minimum voltage reference value $V_{LOW}$.

At this point, the multiphase regulator 20, and in particular the democratic interleaving modulator 11, carries out a first test on the phase contained in the register NEXT, that is the phase F3 in the example shown. Since the control voltage VCNT3 of the phase F3 is greater than the minimum voltage reference $V_{LOW}$, the democratic interleaving modulator 11 resets the ramp signal RAMP3. Moreover, the presence of the corresponding modulation signal RAMP3 having been verified, it updates the cells of the phase register 13 putting LAST=3, OLD=2, and NEXT=1.

Figures 15A, 15B:
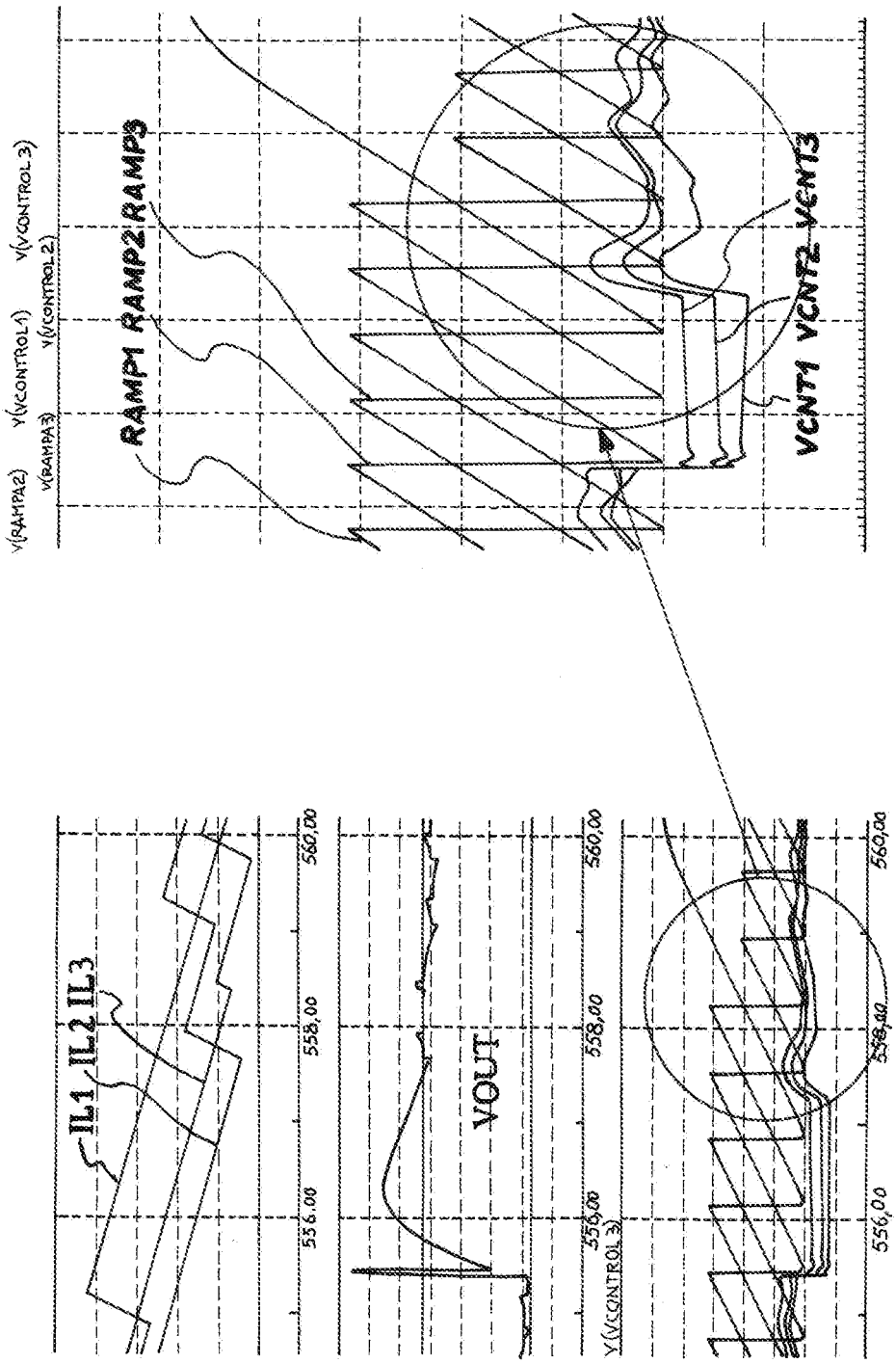

FIGS. 15A and 15B show another situation of intervention of the democratic interleaving modulator DIMOD according to one embodiment of the present invention.

In this case, the multiphase regulator 20 restarts the control after a load release occurrence by turning on the phase F2 (signals IL2 and RAMP2).

At the successive cycle, the democratic interleaving modulator 11 tests that there are the conditions necessary for the turn-on of the phase F3, and then resets the corresponding ramp signal RAMP3.

At this point, the phase register 13 comprises the values: LAST=3, OLD=2, and NEXT=1.

At the following cycle, when a normal (sequential) interleaving operation would turn on the phase F1 (signal IL1 and RAMP1), the democratic interleaving modulator 11 instead tests that the control voltage VCNTi of this phase F1 is lower than the minimum voltage reference value $V_{LOW}$. Advantageously according to this embodiment of the present invention, the democratic interleaving modulator 11 then controls the control voltage of the phase contained in the cell OLD (i.e., the phase F2).

Since the control voltage VCNT2 of the phase F2 is greater than the minimum voltage reference $V_{LOW}$, the democratic interleaving modulator 11 resets the corresponding ramp signal RAMP2 and, after having tested the presence of the modulation signal PWM2 indicating that the phase F2 has been correctly turned on, updates the phase register 13 putting LAST=2, OLD=3, and NEXT=1.

The democratic interleaving modulator 11 then continues to alternatively turn on the phase F2 and the phase F3 until it tests that the control voltage VCNT1 of the phase F1 has become greater than the minimum voltage reference $V_{LOW}$, which is thus a threshold value for the phases Fi.

Figure 16:
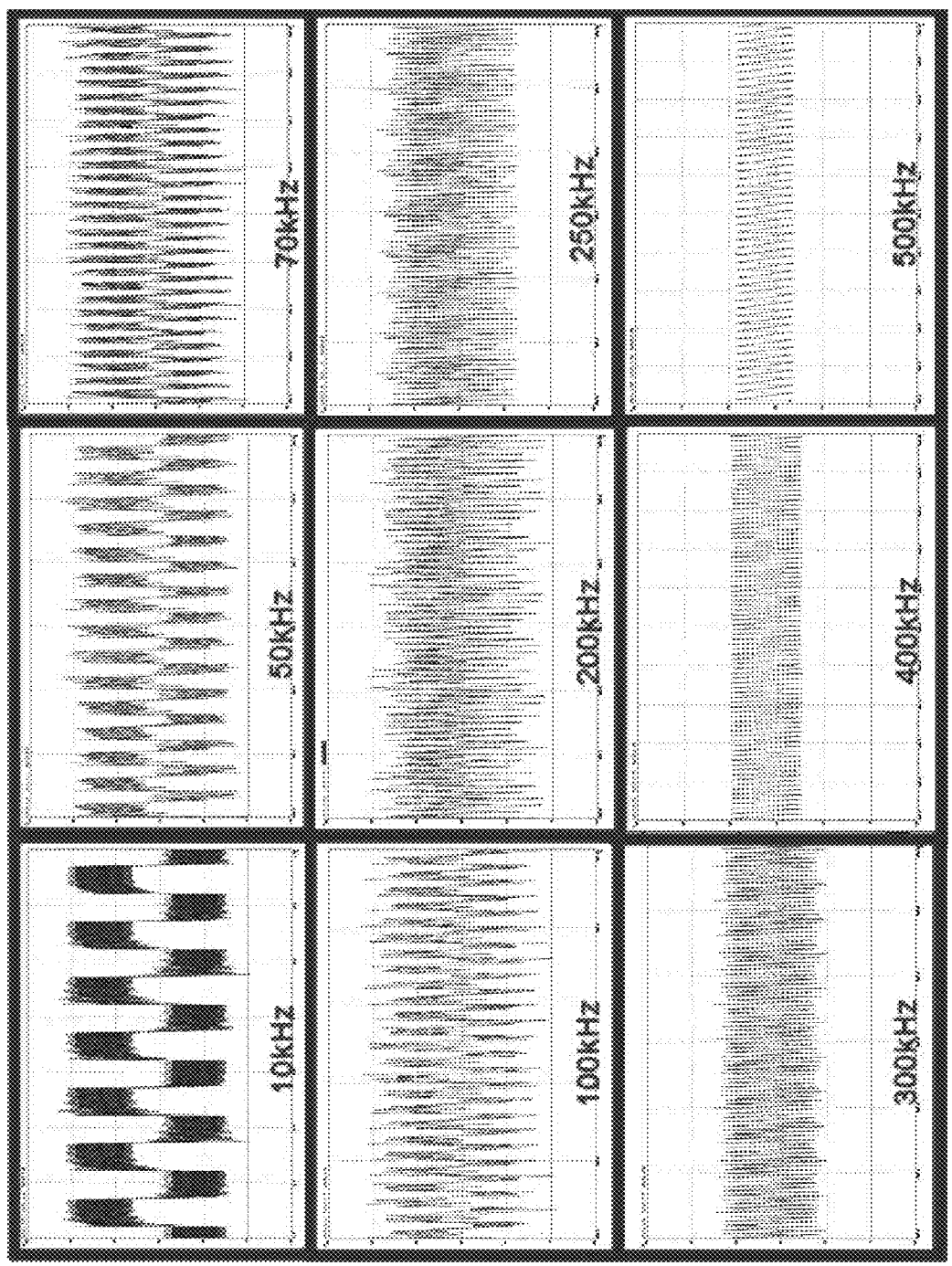

FIG. 16 shows the patterns of the currents of the inductors in a three-phase system with a system switching frequency fSW equal to 300 kHz. In particular, these patterns are shown when the frequency of the load transistors varies from 10 kHz up to 500 kHz.

As shown, the presence of oscillations of the currents due to the beats between the load frequency and the switching frequency proves that the democratic interleaving modulator (DIMOD) 11 is particularly efficient under these critical conditions.

Figure 17:
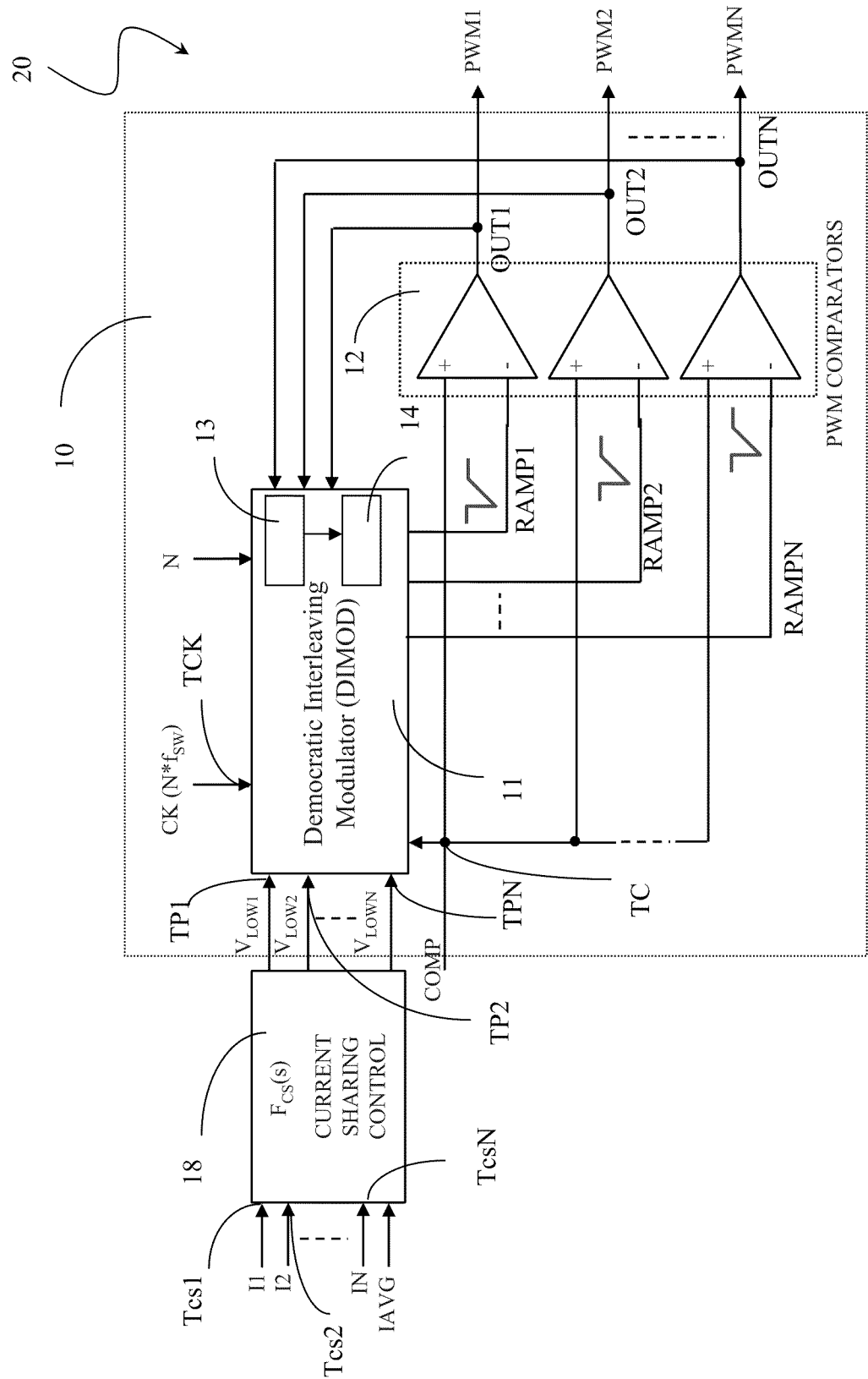
FIGS. 17-21 show the regulation system, the testing procedure, the ramp signal generator, and the multiphase regulator according to a further embodiment of the present invention.

In some embodiments, the correction of the current sharing control circuit 18 is used by adding it to the modulation signals PWMi and not to the control voltages VCNTi, as shown in FIG. 17.

In this case, the current sharing control circuit 18 is connected to multiple supply terminals TPi of the democratic interleaving modulator 11 and supplies them with multiple minimum voltage references $V_{LOW}$ obtained by the current sharing control circuit 18 according to the currents ILi of the phases Fi.

Thus, the modulation signals PWMi are the result of the sum between a normal sawtooth ramp signal RAMPi and the respective minimum voltage reference $V_{LOW}$, which can substantially be indicated as a current sharing error voltage, a common control voltage COMP being applied to the non-inverting input terminals of the comparators of the PWM signal comparator block 12 and sent to the democratic interleaving modulator 11. It is possible to use as common control voltage the output voltage of the error comparator 19.

Figure 18:
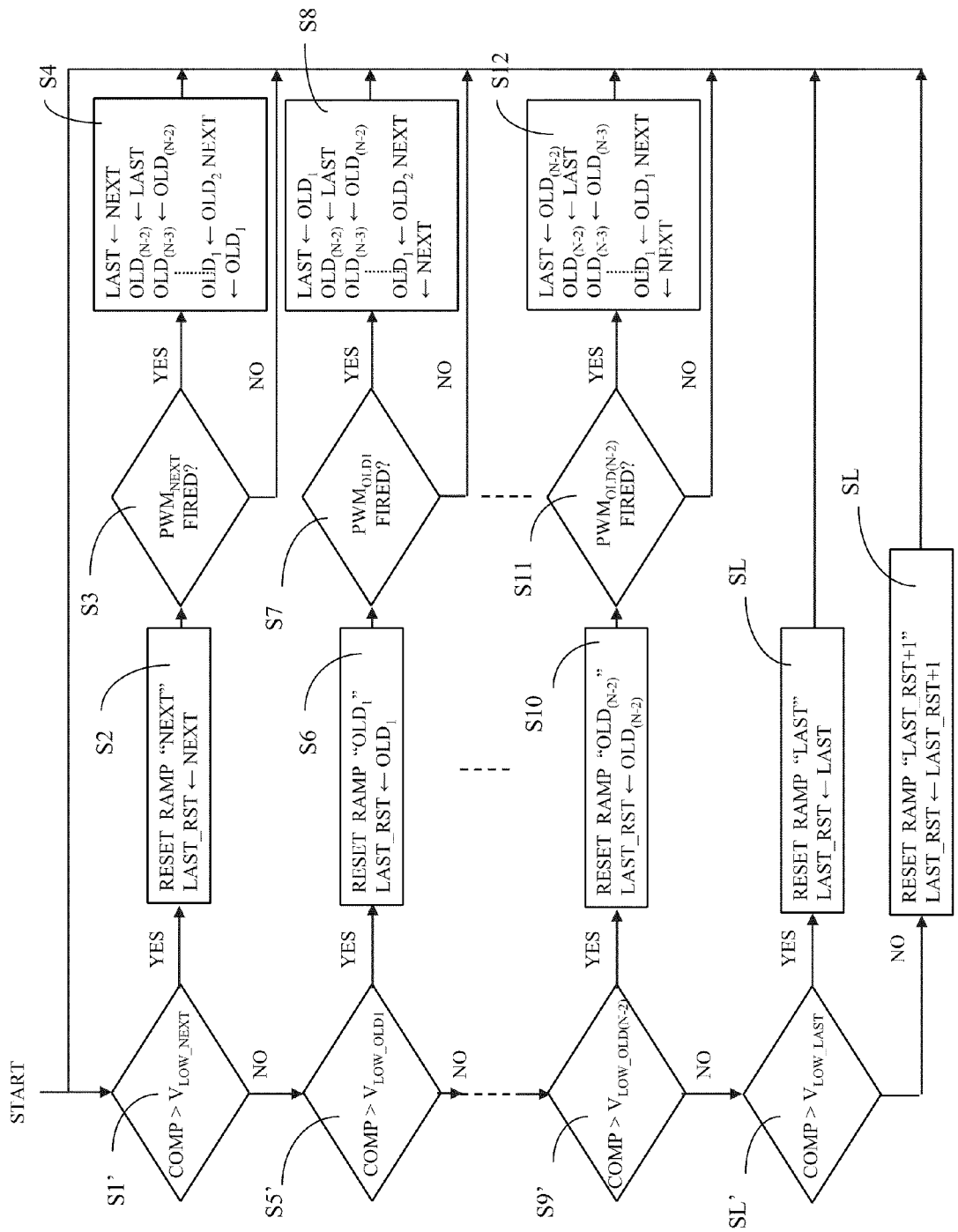

The procedure implemented by the democratic interleaving modulator 11 thus comprises the testing steps S1', S5', S9' and SL if the common control voltage COMP is greater than the value of the minimum voltage reference $V_{LOWi}$ relative to the phase F1 to be turned on, as shown in FIG. 18.

Figure 19:
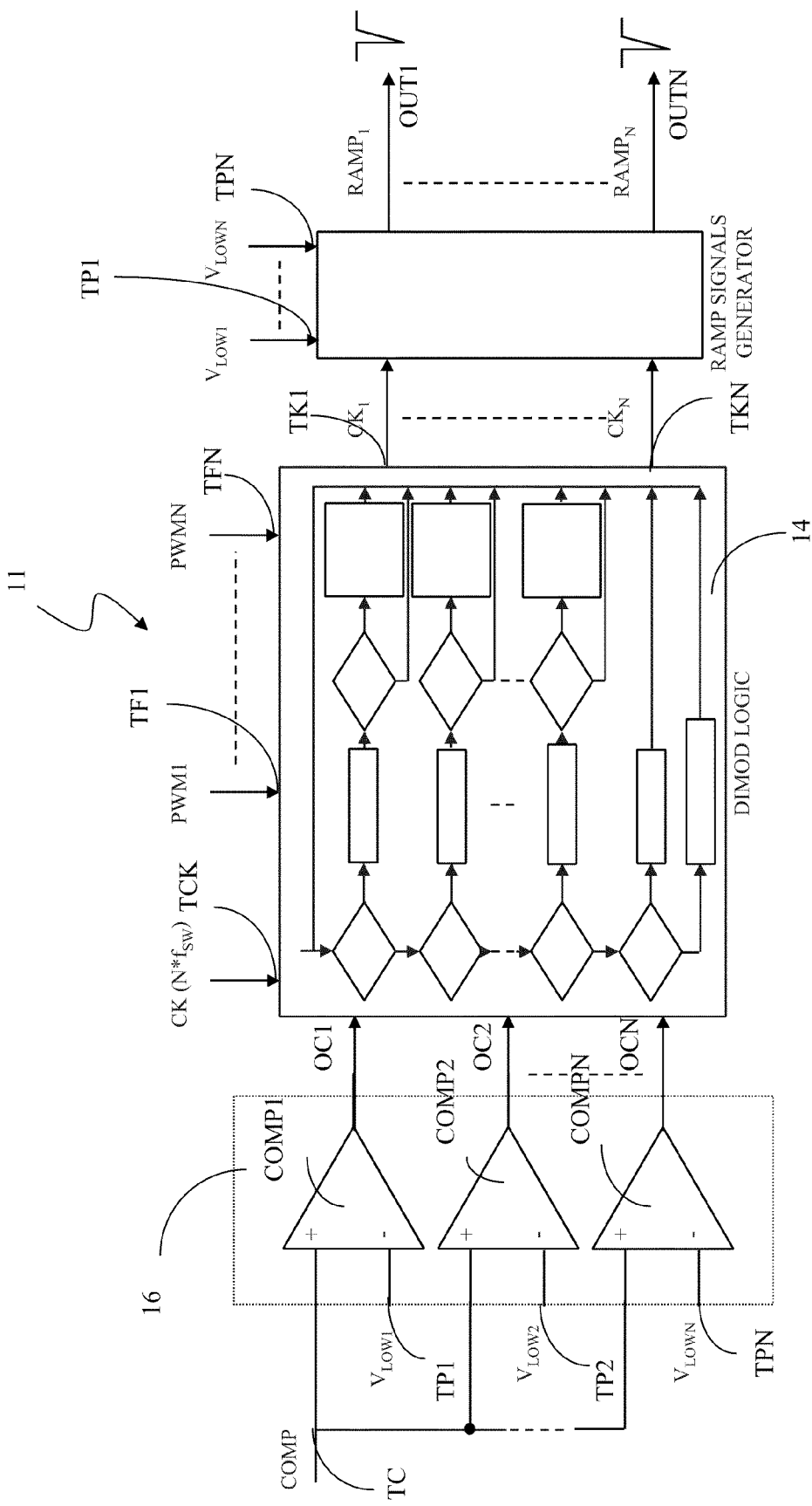
Figure 20:
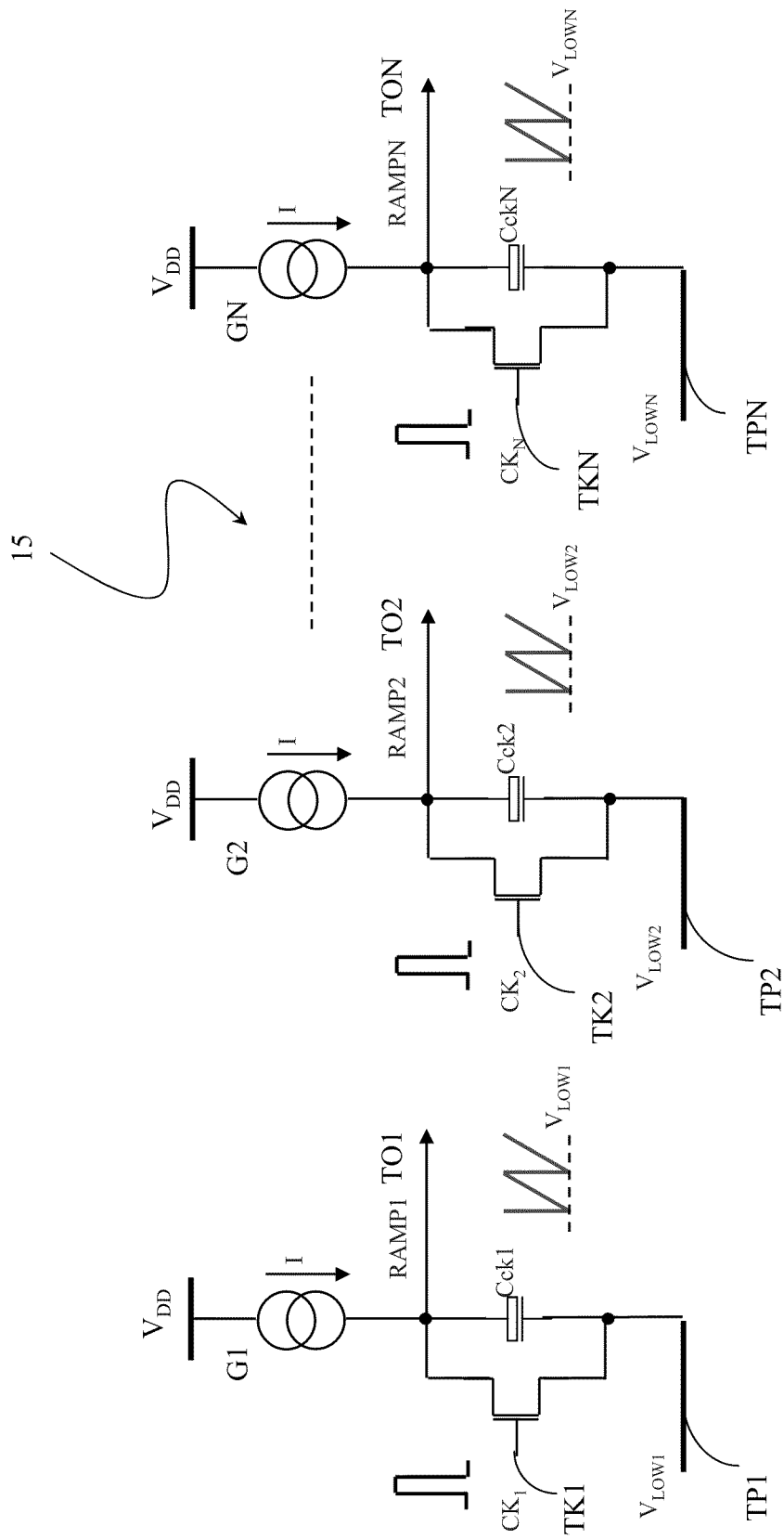
Figure 21:
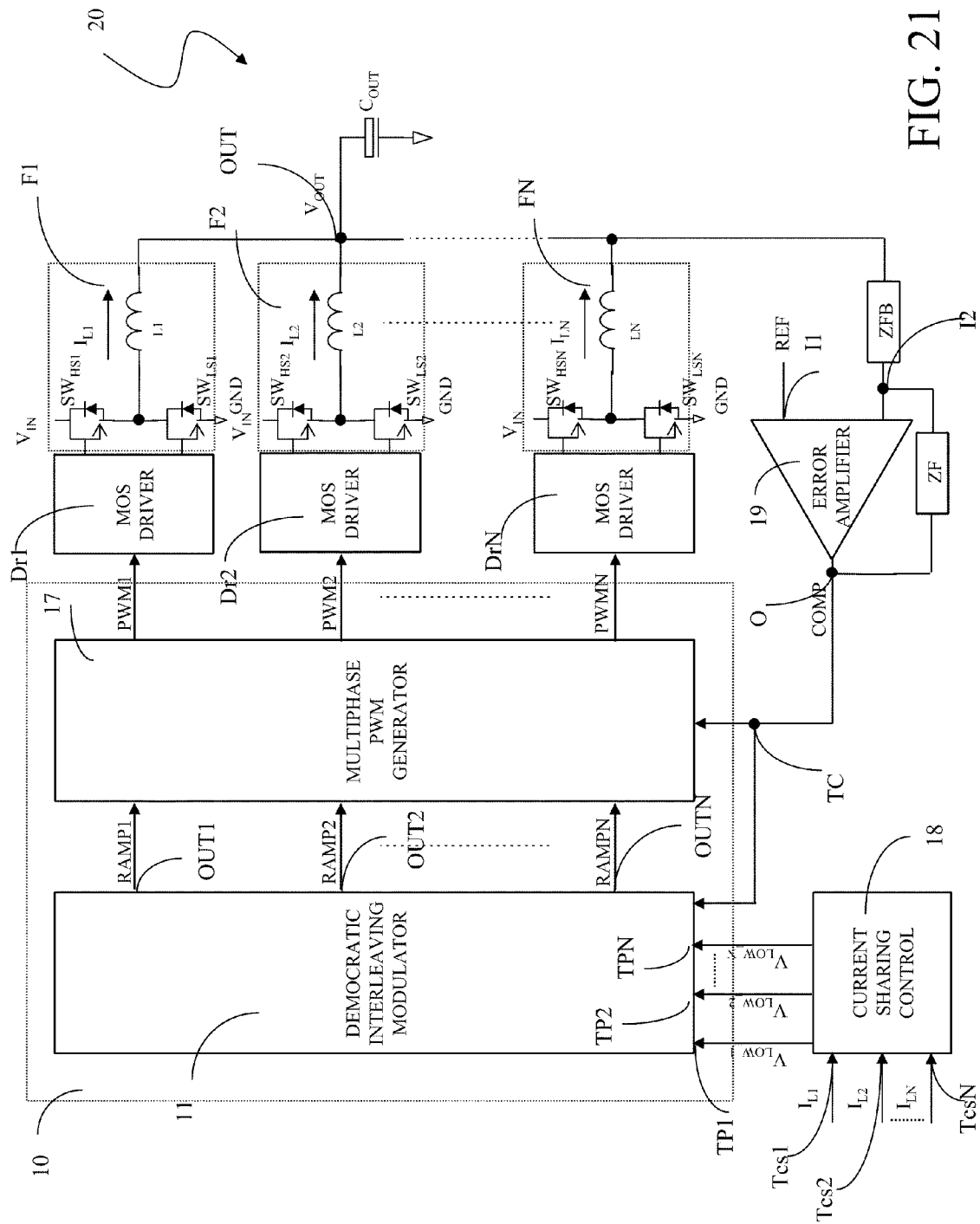

The circuit structures of the modulation system 10 comprising the democratic interleaving modulator 11, the ramp signal generator 15, and the multiphase regulator 20 according to this further embodiment of the present invention are shown in FIGS. 19, 20, and 21.

While in the multiphase regulator 20 of FIG. 13 the correction of current sharing occurs on the control voltages VCNTi, in the embodiment shown in FIG. 21 this correction is made on the ramp signals RAMPi through translation of the same and thus also of their minimum voltage reference $V_{LOWi}$.

Advantageously according to the present invention, a multiphase regulator 20 has been obtained with a higher immunity to noise and lower sensitivity to the external application with respect to conventional systems.

The democratic interleaving modulator 11 is based on a turn-on logic influenced by the status of the control voltages VCNTi, and thus both by the main voltage regulation loop and the current sharing loop.

Moreover, advantageously according to the present invention, the highest of the two currents does not have to be determined, but only a test of whether or not a particular control voltage VCNTi is ready to generate a modulation signal PWMi, the democratic interleaving modulator 11 makes particularly easy the design of the comparators and the current reading circuits connected thereto in the multiphase regulator 20.

Furthermore, the democratic interleaving modulator 11 makes possible the repeated turn-on of the same phase Fk for consecutive clock cycles, except for inner limitations of switching frequency, since it does not use, different from the AFO system, waiting lists for the turn-on of the phases. Each phase Fk can then be potentially turned on at each clock cycle according to the status of its control voltage VCNTk.

The present invention is particularly, but not exclusively, suited to a voltage regulator of the multiphase interleaving type that is able to manage sudden variations of an associated load, and the above description is made with reference to this field of application to simplify its illustration.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, one embodiment of the present invention may not include all of the features described above. Therefore, it is intended that the present invention not be limited to the particular embodiments disclosed, but that the invention include all embodiments falling within the scope of the appended claims.

What is claimed is:

1. A method for controlling turn-on of a plurality of phases of a multiphase regulator of the interleaving type, the phases being turned on by respective modulation signals generated from corresponding ramp signals, and being turned on according to a list of priorities stored by a plurality of cells of a phase register, the method comprising the steps of:

testing conditions necessary for the turn-on of a phase to be turned on that is indicated by a first cell of the phase register;

in response to a positive result of the test of the conditions necessary for the turn-on of a phase to be turned on, resetting a corresponding ramp signal;

after the step of resetting the corresponding ramp signal, testing conditions necessary for the turn-on of a phase successive to the phase to be turned on according to the list of priorities of the phase register, and resetting corresponding ramp signals in response to a positive result of such testing; and in response to no positive results of testing conditions necessary for the turn-on of all phases successive to the phase to be turned on, forcing reset of a ramp signal corresponding to a phase successive to a last turned on phase that is indicated by a last cell of the phase register, and returning to the step of testing the conditions necessary for the turn-on of a phase to be turned on.

2. The method according to claim 1, wherein the testing of the conditions necessary for the turn-on of a phase comprises determining whether or not a control voltage of that phase is greater than a minimum voltage reference value.

3. The method according to claim 1, wherein the testing of the conditions necessary for the turn-on of a phase comprises determining whether or not a common control voltage is greater than a minimum voltage reference value relative to that phase.

4. The method according to claim 1, wherein the testing of the conditions necessary for the turn-on of a phase comprise updating a further cell indicating a last reset of the phase register by inserting an identifying number of the turned on phase in the further cell.

5. The method according to claim 4, further comprising:
after the updating, testing the presence or not of a corresponding modulation signal.

6. The method according to claim 5, further comprising:
in response to a positive result of the testing of the presence or not of a corresponding modulation signal, updating the phase register by inserting an identifying number of the phase that has been turned on in the last cell of the phase register, and shifting values contained in the other cells in consequence.

7. The method according to claim 6, wherein the updating of the phase register is not performed if the testing of the conditions necessary for the turn-on of a phase has given a positive result on a last turned-on phase indicated by an identifying number contained in the last cell of the phase register.

8. A modulation system comprising:
an interleaving multiphase regulator having a plurality of phases;
a PWM signal comparator block for the phases;
a modulator configured to supply a plurality of ramp signals to the PWM signal comparator block, the modulator including control logic configured to determine a reset sequence of the ramp signals; and
a current sharing control circuit configured to generate a plurality of minimum voltage references respectively based on respective currents of the respective phases, wherein:
the PWM signal comparator comprises a plurality of comparators respectively corresponding to the phases, each of the comparators having:
a first input terminal that is configured to receive a control voltage signal, and a second input terminal configured to receive a respective ramp signal of the plurality of ramp signals from the modulator, and the modulator includes a control terminal configured to receive the control voltage signal and a plurality of supply terminals configured to receive the plurality of minimum voltage references from the current sharing control circuit, the modulator being configured to generate the ramp signals based on the minimum voltage references.

9. A modulation system comprising:
a multiphase regulator of the interleaving type having a plurality of phases;
a PWM signal comparator block for the phases; and
a modulator configured to supply a plurality of ramp signals to the PWM signal comparator block, the modulator including control logic for determining a reset sequence of the ramp signals,
wherein the modulator further comprises a phase register, the phase register including a plurality of cells storing a list of priorities, each of the cells indicating one of the phases, a first cell indicating a phase to be turned on as determined by the control logic and a last cell indicating a last turned on phase.

10. The modulation system according to claim 9, wherein the control logic is configured to update the cells of the phase register by indicating a phase which is turned on in the last cell and shifting values of the other cells.

11. The modulation system according to claim 8, wherein each of the comparators has an output terminal that configured to supply a respective one of a plurality of modulation signals for respectively controlling the phases.

12. The modulation system according to claim 8, wherein the modulator further comprises a plurality of feedback terminals connected to output terminals of the PWM signal comparator.

13. A modulation system comprising:
a multiphase regulator of the interleaving type having a plurality of phases;
a PWM signal comparator block for the phases; and
a modulator configured to supply a plurality of ramp signals to the PWM signal comparator block, the modulator including control logic for determining a reset sequence of the ramp signals,
wherein the modulator comprises:
a supply terminal configured to receive a minimum voltage reference corresponding to a minimum voltage value of modulation signals for controlling the phases; and
a ramp signal generator connected to a plurality of output terminals of the control logic and configure to receive the minimum voltage reference, the ramp signal generator having a plurality of output terminals configured to supply the ramp signals.

14. The modulation system according to claim 13, wherein the modulator comprises an input comparator block that includes a plurality of comparators whose number is identical to the number of phases, each of the comparators having a first input terminal connected to a respective control terminal for receiving a control voltage signal, a second input terminal configured to receive the minimum voltage reference, and an output terminal connected to corresponding input terminals of the control logic.

15. The modulation system according to claim 13, wherein the ramp signal generator comprises:
a minimum voltage reference terminal configured to receive the minimum voltage reference;
supply voltage reference terminal configured to receive a supply voltage reference a plurality of current generators;
a plurality of capacitors; and
a plurality of MOS transistors for the phases, respectively, each of the MOS transistors being coupled to a corresponding current generator of the plurality of generators between the supply voltage reference terminal and the minimum voltage reference terminal, and the capacitors being respectively coupled between the minimum voltage reference terminal and the output terminals of the ramp signal generator, each of the MOS transistors having a control terminal connected to a respective one of the output terminals of the control logic.

16. A modulation system comprising:
a multiphase regulator of the interleaving type having a plurality of phases;
a PWM signal comparator block for the phases; and
a modulator configured to supply a plurality of ramp signals to the PWM signal comparator block, the modulator comprising control logic for determining a reset sequence of the ramp signals,
wherein the modulator comprises:
a control terminal configured to receive a common control voltage signal;
a plurality of supply terminals configured to receive a plurality of minimum voltage references from a current sharing control circuit on the basis of currents of the phases; and
an input comparator block that includes a plurality of comparators whose number is identical to the number of phases, each of the comparators having a first input terminal configured to receive the common control voltage signal, a second input terminal configured to receive a respective one of the minimum voltage references, and an output terminal connected to corresponding input terminals of the control logic.

17. The modulation system according to claim 16, wherein the ramp signal generator comprises:
a plurality of current generators;
a plurality of MOS transistors respectively for the phases, each of the MOS transistors being coupled to a corresponding one of the current generators between a supply voltage reference terminal and a minimum voltage reference terminal; and
a plurality of capacitors respectively coupled between a respective output terminal and the minimum voltage reference terminal, the MOS transistors having respective control terminals connected to the output terminals of the control logic.

18. A multiphase regulator including at least one modulation system connected to a plurality of phases, each of the phases including a pair of switches driven by a corresponding driving circuit so as to supply a suitable output voltage value to an output terminal of the multiphase regulator, the multiphase regulator comprising:
a PWM signal generator connected to a modulator of the modulation system for supplying modulation signals to the phases;
a current sharing control circuit configured to receive currents of the phases; and
an error comparator having a first input terminal configured to receive a reference voltage value, and a second input terminal connected, through a first impedance, to the output terminal and, through a second impedance, to an output terminal of the error comparator,
wherein the modulation system comprises:
a multiphase regulator of the interleaving type having a plurality of phases;

a PWM signal comparator block for the phases; and a modulator configured to supply a plurality of ramp signals to the PWM signal comparator block, the modulator comprising control logic for determining a reset sequence of the ramp signals, and a phase register that includes a plurality of cells storing a list of priorities, each of the cells indicating one of the phases, a first cell indicating a phase to be turned on as determined by the control logic and a last cell indicating a last turned on phase.

19. The multiphase regulator according to claim 18, wherein the current sharing control circuit is configured to supply a plurality of balance voltages a plurality of adder nodes that are configured to add the balance voltages to a signal on the output terminal of the error comparator.

20. The multiphase regulator according to claim 18, wherein the current sharing control circuit is configured to supply a plurality of minimum voltage references to a plurality of supply terminals of the modulator, and the output terminal of the error comparator is connected to a control terminal of the PWM signal generator.

\* \* \* \* \*